(12) United States Patent
Biltoft et al.

(10) Patent No.: US 9,914,097 B2
(45) Date of Patent: Mar. 13, 2018

(54) FLUID FLOW DISTRIBUTION DEVICE

(75) Inventors: Bruce Gregory Biltoft, Chatswood (AU); Zhiyi Cao, Lidcombe (AU); Jen Thai Law, Cabramatta (AU); Huw Alexander Lazaredes, Woolloomooloo (AU)

(73) Assignee: Evoqua Water Technologies LLC, Pittsburgh, PA (US)

( * ) Notice: Subject to any disclaimer, the term of this patent is extended or adjusted under 35 U.S.C. 154(b) by 0 days.

(21) Appl. No.: 13/643,619

(22) PCT Filed: Mar. 28, 2011

(86) PCT No.: PCT/US2011/030168
§ 371 (c)(1),
(2), (4) Date: Oct. 26, 2012

(87) PCT Pub. No.: WO2011/136888
PCT Pub. Date: Nov. 3, 2011

(65) Prior Publication Data
US 2013/0037467 A1     Feb. 14, 2013

(30) Foreign Application Priority Data
Apr. 30, 2010 (AU) ................................ 2010901864

(51) Int. Cl.
*B01D 65/00* (2006.01)
*B01D 63/02* (2006.01)
*B01D 65/02* (2006.01)

(52) U.S. Cl.
CPC ............. *B01D 63/02* (2013.01); *B01D 65/02* (2013.01); *B01D 2313/08* (2013.01);
(Continued)

(58) Field of Classification Search
CPC ............. B01D 2321/185; B01D 65/08; B01D 2315/06; B01D 63/02; B01D 2313/26;
(Continued)

(56) References Cited

U.S. PATENT DOCUMENTS 256,008 A    4/1882  Leak
285,321 A    9/1883  Tams
(Continued)

FOREIGN PATENT DOCUMENTS

AU        34400/84 A    4/1985
AU        55847/86 A    9/1986
(Continued)

OTHER PUBLICATIONS

"Chemical Cleaning Definition", Lenntech BV, Lenntech Water Treatment & Purification Holding B.V., Chemical Cleaning.
(Continued)

*Primary Examiner* — Pranav N Patel

(57) ABSTRACT

In a first membrane filtration module comprises a membrane module comprising a plurality of permeable hollow membranes; a fluid distribution device adapted to removably surround at least a portion of the membranes of the membrane module, the fluid distribution device comprising a plurality of through-hole openings for distributing a fluid, and the fluid distribution device adapted to distribute a flow of fluid along a surface of the permeable hollow membranes. In a second membrane filtration device comprises a membrane module comprising a plurality of permeable hollow membranes, each of the permeable hollow membranes having a surface; and a gas distribution device: adapted to distribute gas bubbles to the surface of the permeable hollow membrane, adapted to removably surround at least a portion
(Continued)

of the plurality of permeable hollow membranes, and defining a plurality of through openings for distributing the gas bubbles to the membranes.

20 Claims, 6 Drawing Sheets

(52) U.S. Cl.
CPC ...... *B01D 2313/10* (2013.01); *B01D 2313/26* (2013.01); *B01D 2321/04* (2013.01); *B01D 2321/185* (2013.01)

(58) Field of Classification Search
CPC .... B01D 65/02; B01D 2321/04; B01D 63/04; B01D 2313/08; B01D 65/00; B01D 2313/10; B01D 2313/21; B01D 2317/04; B01D 63/06; B01D 2201/087; B01D 2313/02; B01D 29/6438; B01D 63/022; B01D 63/043; B01D 63/04612; B01D 63/106; B01D 2201/86; B01D 2201/87; B01D 2201/295; B01D 69/04; B01D 69/08; B01D 61/14; B01D 61/145; B01D 61/147; B01D 61/18; B01D 61/20
USPC ........... 210/636, 321.69, 650, 321.8, 500.23, 210/321.6, 220, 333.01, 221.2, 258, 210/321.9, 644, 649, 106, 108, 275, 210/321.72; 261/98
See application file for complete search history.

(56) References Cited

U.S. PATENT DOCUMENTS

| | | |
|---|---|---|
| 403,507 A | 5/1889 | Bode |
| 511,995 A | 1/1894 | Buckley |
| 1,997,074 A | 4/1935 | Novotny |
| 2,080,783 A | 5/1937 | Petersen |
| 2,105,700 A | 1/1938 | Ramage |
| 2,843,038 A | 7/1958 | Manspeaker |
| 2,926,086 A | 2/1960 | Chenicek et al. |
| 3,068,655 A | 12/1962 | Murray et al. |
| 3,139,401 A | 6/1964 | Hach |
| 3,183,191 A | 5/1965 | Hach |
| 3,191,674 A | 6/1965 | Richardson |
| 3,198,636 A | 8/1965 | Bouthilet |
| 3,228,876 A | 1/1966 | Mahon |
| 3,246,761 A | 4/1966 | Bryan et al. |
| 3,275,554 A | 9/1966 | Wagenaar |
| 3,442,002 A | 5/1969 | Geary et al. |
| 3,462,362 A | 8/1969 | Kollsman |
| 3,472,168 A | 10/1969 | Inoue et al. |
| 3,472,765 A | 10/1969 | Budd et al. |
| 3,492,698 A | 2/1970 | Geary et al. |
| 3,501,798 A | 3/1970 | Carraro |
| 3,505,215 A | 4/1970 | Bray |
| 3,556,305 A | 1/1971 | Shorr |
| 3,563,860 A | 2/1971 | Henderyckx |
| 3,591,010 A | 7/1971 | Pall et al. |
| 3,592,450 A | 7/1971 | Rippon |
| 3,625,827 A | 12/1971 | Wildi et al. |
| 3,628,775 A | 12/1971 | McConnell et al. |
| 3,654,147 A | 4/1972 | Levin |
| 3,679,052 A | 7/1972 | Asper |
| 3,689,009 A | 9/1972 | Terrell |
| 3,693,406 A | 9/1972 | Tobin, III |
| 3,700,561 A | 10/1972 | Ziffer |
| 3,700,591 A | 10/1972 | Higley |
| 3,708,071 A | 1/1973 | Crowley |
| 3,728,256 A | 4/1973 | Cooper |
| 3,763,055 A | 10/1973 | White et al. |
| 3,791,631 A | 2/1974 | Meyer |
| 3,795,609 A | 3/1974 | Hill et al. |
| 3,804,258 A | 4/1974 | Okuniewski et al. |
| 3,843,809 A | 10/1974 | Luck |
| 3,876,738 A | 4/1975 | Marinaccio et al. |
| 3,912,624 A | 10/1975 | Jennings |
| 3,937,015 A | 2/1976 | Akado et al. |
| 3,955,998 A | 5/1976 | Clampitt et al. |
| 3,962,095 A | 6/1976 | Luppi |
| 3,968,192 A | 7/1976 | Hoffman, III et al. |
| 3,982,095 A | 9/1976 | Robinson |
| 3,992,301 A | 11/1976 | Shippey et al. |
| 3,993,816 A | 11/1976 | Baudet et al. |
| 4,016,078 A | 4/1977 | Clark |
| 4,049,765 A | 9/1977 | Yamazaki |
| 4,076,656 A | 2/1978 | White et al. |
| 4,082,683 A | 4/1978 | Galesloot |
| 4,105,556 A | 8/1978 | O'Amaddio et al. |
| 4,105,731 A | 8/1978 | Yamazaki |
| 4,107,043 A | 8/1978 | McKinney |
| 4,130,622 A | 12/1978 | Pawlak |
| 4,138,460 A | 2/1979 | Tigner |
| 4,157,899 A | 6/1979 | Wheaton |
| 4,169,873 A | 10/1979 | Lipert |
| 4,183,890 A | 1/1980 | Bollinger |
| 4,187,263 A | 2/1980 | Lipert |
| 4,188,817 A | 2/1980 | Steigelmann |
| 4,190,411 A | 2/1980 | Fujimoto |
| 4,190,419 A | 2/1980 | Bauer |
| 4,192,750 A | 3/1980 | Elfes et al. |
| 4,193,780 A | 3/1980 | Cotton, Jr. et al. |
| 4,203,848 A | 5/1980 | Grandine, II |
| 4,204,961 A | 5/1980 | Cusato, Jr. |
| 4,218,324 A | 8/1980 | Hartmann et al. |
| 4,226,921 A | 10/1980 | Tsang |
| 4,227,295 A | 10/1980 | Bodnar et al. |
| 4,230,583 A | 10/1980 | Chiolle et al. |
| 4,243,525 A | 1/1981 | Greenberg |
| 4,247,498 A | 1/1981 | Castro |
| 4,248,648 A | 2/1981 | Kopp |
| 4,253,936 A | 3/1981 | Leysen et al. |
| 4,271,026 A | 6/1981 | Chen et al. |
| 4,272,379 A | 6/1981 | Pollock |
| 4,302,336 A | 11/1981 | Kawaguchi et al. |
| 4,315,819 A | 2/1982 | King et al. |
| 4,323,453 A | 4/1982 | Zampini |
| 4,340,479 A | 7/1982 | Pall |
| 4,350,592 A | 9/1982 | Kronsbein |
| 4,353,802 A | 10/1982 | Hara et al. |
| 4,359,359 A | 11/1982 | Gerlach et al. |
| 4,367,139 A | 1/1983 | Graham |
| 4,367,140 A | 1/1983 | Wilson |
| 4,369,605 A | 1/1983 | Opersteny et al. |
| 4,371,427 A | 2/1983 | Holler et al. |
| 4,384,474 A | 5/1983 | Kowalski |
| 4,385,150 A | 5/1983 | Miyake et al. |
| 4,388,189 A | 6/1983 | Kawaguchi et al. |
| 4,389,363 A | 6/1983 | Molthop |
| 4,405,688 A | 9/1983 | Lowery et al. |
| 4,407,975 A | 10/1983 | Yamaguchi |
| 4,414,113 A | 11/1983 | LaTerra |
| 4,414,172 A | 11/1983 | Leason |
| 4,415,452 A | 11/1983 | Heil et al. |
| 4,431,545 A | 2/1984 | Pall et al. |
| 4,451,369 A | 5/1984 | Sekino et al. |
| 4,462,855 A | 7/1984 | Yankowsky et al. |
| 4,467,001 A | 8/1984 | Coplan et al. |
| 4,476,015 A | 10/1984 | Schmitt et al. |
| 4,476,112 A | 10/1984 | Aversano |
| 4,491,522 A | 1/1985 | Ishida et al. |
| 4,496,470 A | 1/1985 | Kapiloff et al. |
| 4,511,471 A | 4/1985 | Muller |
| 4,519,909 A | 5/1985 | Castro |
| 4,539,940 A | 9/1985 | Young |
| 4,540,490 A | 9/1985 | Shibata et al. |
| 4,545,862 A | 10/1985 | Gore et al. |
| 4,547,289 A | 10/1985 | Okano et al. |
| 4,609,465 A | 9/1986 | Miller |
| 4,610,789 A | 9/1986 | Barch |
| 4,614,109 A | 9/1986 | Hofmann |
| 4,623,460 A | 11/1986 | Kuzumoto et al. |
| 4,623,670 A | 11/1986 | Mutoh et al. |

(56) References Cited

U.S. PATENT DOCUMENTS

| | | |
|---|---|---|
| 4,629,563 A | 12/1986 | Wrasidlo |
| 4,632,745 A | 12/1986 | Giuffrida et al. |
| 4,636,296 A | 1/1987 | Kunz |
| 4,642,182 A | 2/1987 | Drori |
| 4,647,377 A | 3/1987 | Miura |
| 4,650,586 A | 3/1987 | Ellis, III |
| 4,650,596 A | 3/1987 | Schlueter et al. |
| 4,656,865 A | 4/1987 | Callan |
| 4,660,411 A | 4/1987 | Reid |
| 4,666,543 A | 5/1987 | Kawano |
| 4,670,145 A | 6/1987 | Edwards |
| 4,673,507 A | 6/1987 | Brown |
| 4,687,561 A | 8/1987 | Kunz |
| 4,687,578 A | 8/1987 | Stookey |
| 4,688,511 A | 8/1987 | Gerlach et al. |
| 4,689,191 A | 8/1987 | Beck et al. |
| 4,702,830 A | 10/1987 | Makino et al. |
| 4,702,836 A | 10/1987 | Mutoh et al. |
| 4,702,840 A | 10/1987 | Degen et al. |
| 4,707,266 A | 11/1987 | Degen et al. |
| 4,708,799 A | 11/1987 | Gerlach et al. |
| 4,718,270 A | 1/1988 | Storr |
| 4,744,240 A | 5/1988 | Reichelt |
| 4,749,487 A | 6/1988 | Lefebvre |
| 4,752,421 A | 6/1988 | Makino |
| 4,756,875 A | 7/1988 | Tajima et al. |
| 4,763,612 A | 8/1988 | Iwanami |
| 4,767,539 A | 8/1988 | Ford |
| 4,769,140 A | 9/1988 | van Dijk et al. |
| 4,774,132 A | 9/1988 | Joffee et al. |
| 4,775,471 A | 10/1988 | Nagai et al. |
| 4,779,448 A | 10/1988 | Gogins |
| 4,781,831 A | 11/1988 | Goldsmith |
| 4,784,771 A | 11/1988 | Wathen et al. |
| 4,793,932 A | 12/1988 | Ford et al. |
| 4,797,187 A | 1/1989 | Davis et al. |
| 4,797,211 A | 1/1989 | Ehrfeld et al. |
| 4,800,019 A | 1/1989 | Bikson et al. |
| 4,810,384 A | 3/1989 | Fabre |
| 4,812,235 A | 3/1989 | Seleman et al. |
| 4,816,160 A | 3/1989 | Ford et al. |
| 4,824,563 A | 4/1989 | Iwahori et al. |
| 4,828,696 A | 5/1989 | Makino et al. |
| 4,834,998 A | 5/1989 | Shrikhande |
| 4,839,048 A | 6/1989 | Reed et al. |
| 4,840,227 A | 6/1989 | Schmidt |
| 4,846,970 A | 7/1989 | Bertelsen et al. |
| 4,867,883 A | 9/1989 | Daigger et al. |
| 4,876,006 A | 10/1989 | Ohkubo et al. |
| 4,876,012 A | 10/1989 | Kopp et al. |
| 4,886,601 A | 12/1989 | Iwatsuka et al. |
| 4,888,115 A | 12/1989 | Marinaccio et al. |
| 4,889,620 A | 12/1989 | Schmit et al. |
| 4,904,426 A | 2/1990 | Lundgard et al. |
| 4,908,114 A | 3/1990 | Ayers |
| 4,911,838 A | 3/1990 | Tanaka |
| 4,919,815 A | 4/1990 | Copa et al. |
| 4,921,610 A | 5/1990 | Ford et al. |
| 4,931,186 A | 6/1990 | Ford et al. |
| 4,933,084 A | 6/1990 | Bandel et al. |
| 4,935,143 A | 6/1990 | Kopp et al. |
| 4,952,317 A | 8/1990 | Culkin |
| 4,963,304 A | 10/1990 | Im et al. |
| 4,966,699 A | 10/1990 | Sasaki et al. |
| 4,968,430 A | 11/1990 | Hildenbrand et al. |
| 4,968,733 A | 11/1990 | Muller et al. |
| 4,969,997 A | 11/1990 | Kluver et al. |
| 4,980,066 A | 12/1990 | Slegers |
| 4,988,444 A | 1/1991 | Applegate et al. |
| 4,990,251 A | 2/1991 | Spranger et al. |
| 4,999,038 A | 3/1991 | Lundberg |
| 5,002,666 A | 3/1991 | Matsumoto et al. |
| 5,005,430 A | 4/1991 | Kibler et al. |
| 5,015,275 A | 5/1991 | Beck et al. |
| 5,024,762 A | 6/1991 | Ford et al. |
| 5,034,125 A | 7/1991 | Karbachsch et al. |
| 5,043,113 A | 8/1991 | Kafchinski et al. |
| 5,059,317 A | 10/1991 | Marius et al. |
| 5,066,375 A | 11/1991 | Parsi et al. |
| 5,066,401 A | 11/1991 | Muller et al. |
| 5,066,402 A | 11/1991 | Anselme et al. |
| 5,069,065 A | 12/1991 | Sprunt et al. |
| 5,069,353 A | 12/1991 | Espenan |
| 5,075,044 A | 12/1991 | Augem |
| 5,075,065 A | 12/1991 | Effenberger et al. |
| 5,076,925 A | 12/1991 | Roesink et al. |
| 5,079,272 A | 1/1992 | Allegrezza, Jr. et al. |
| 5,080,770 A | 1/1992 | Culkin |
| 5,094,750 A | 3/1992 | Kopp et al. |
| 5,094,867 A | 3/1992 | Detering et al. |
| 5,098,567 A | 3/1992 | Nishiguchi |
| 5,102,550 A | 4/1992 | Pizzino et al. |
| 5,104,535 A | 4/1992 | Cote et al. |
| 5,104,546 A | 4/1992 | Filson et al. |
| H001045 H | 5/1992 | Wilson |
| 5,135,663 A | 8/1992 | Newberth, III et al. |
| 5,137,631 A | 8/1992 | Eckman et al. |
| 5,138,870 A | 8/1992 | Lyssy |
| 5,147,553 A | 9/1992 | Waite |
| 5,151,191 A | 9/1992 | Sunaoka et al. |
| 5,151,193 A | 9/1992 | Grobe et al. |
| 5,156,738 A | 10/1992 | Maxson |
| 5,158,721 A | 10/1992 | Allegrezza, Jr. et al. |
| 5,169,528 A | 12/1992 | Karbachsch et al. |
| 5,169,530 A | 12/1992 | Schucker et al. |
| 5,180,407 A | 1/1993 | DeMarco |
| 5,182,019 A | 1/1993 | Cote et al. |
| 5,186,821 A | 2/1993 | Murphy |
| 5,192,442 A | 3/1993 | Piccirillo et al. |
| 5,192,456 A | 3/1993 | Ishida et al. |
| 5,192,478 A | 3/1993 | Caskey |
| 5,194,149 A | 3/1993 | Selbie et al. |
| 5,198,116 A | 3/1993 | Comstock et al. |
| 5,198,162 A | 3/1993 | Park et al. |
| 5,203,405 A | 4/1993 | Gentry et al. |
| 5,209,852 A | 5/1993 | Sunaoka et al. |
| 5,211,823 A | 5/1993 | Giuffrida et al. |
| 5,221,478 A | 6/1993 | Dhingra et al. |
| 5,227,063 A | 7/1993 | Langerak et al. |
| 5,244,579 A | 9/1993 | Horner et al. |
| 5,248,424 A | 9/1993 | Cote et al. |
| 5,262,054 A | 11/1993 | Wheeler |
| 5,269,919 A | 12/1993 | von Medlin |
| 5,271,830 A | 12/1993 | Faivre et al. |
| 5,275,766 A | 1/1994 | Gadkaree et al. |
| 5,286,324 A | 2/1994 | Kawai et al. |
| 5,290,451 A | 3/1994 | Koster et al. |
| 5,290,457 A | 3/1994 | Karbachsch et al. |
| 5,297,420 A | 3/1994 | Gilliland et al. |
| 5,316,671 A | 5/1994 | Murphy |
| 5,320,760 A | 6/1994 | Freund et al. |
| 5,353,630 A | 10/1994 | Soda et al. |
| 5,354,470 A | 10/1994 | Seita et al. |
| 5,358,732 A | 10/1994 | Seifter et al. |
| 5,361,625 A | 11/1994 | Ylvisaker |
| 5,364,527 A | 11/1994 | Zimmermann et al. |
| 5,364,529 A | 11/1994 | Morin et al. |
| 5,374,353 A | 12/1994 | Murphy |
| 5,389,260 A | 2/1995 | Hemp et al. |
| 5,393,433 A | 2/1995 | Espenan et al. |
| 5,396,019 A | 3/1995 | Sartori et al. |
| 5,401,401 A | 3/1995 | Hickok et al. |
| 5,401,405 A | 3/1995 | McDougald |
| 5,403,479 A | 4/1995 | Smith et al. |
| 5,405,528 A * | 4/1995 | Selbie et al. ................. 210/232 |
| 5,411,663 A | 5/1995 | Johnson |
| 5,417,101 A | 5/1995 | Weich |
| 5,419,816 A | 5/1995 | Sampson et al. |
| 5,425,415 A | 6/1995 | Master et al. |
| 5,451,317 A | 9/1995 | Ishida et al. |
| 5,458,779 A | 10/1995 | Odegaard |
| 5,468,397 A | 11/1995 | Barboza et al. |
| 5,470,469 A | 11/1995 | Eckman |
| 5,477,731 A | 12/1995 | Mouton |

(56) References Cited

U.S. PATENT DOCUMENTS

| | | |
|---|---|---|
| 5,479,590 A | 12/1995 | Lin |
| 5,480,553 A | 1/1996 | Yamamori et al. |
| 5,482,625 A | 1/1996 | Shimizu et al. |
| 5,484,528 A | 1/1996 | Yagi et al. |
| 5,490,939 A | 2/1996 | Gerigk et al. |
| 5,491,023 A | 2/1996 | Tsai et al. |
| 5,501,798 A | 3/1996 | Al-Samadi et al. |
| 5,525,220 A | 6/1996 | Yagi et al. |
| 5,531,848 A | 7/1996 | Brinda et al. |
| 5,531,900 A | 7/1996 | Raghavan et al. |
| 5,543,002 A | 8/1996 | Brinda et al. |
| 5,552,047 A | 9/1996 | Oshida et al. |
| 5,554,283 A | 9/1996 | Brinda et al. |
| 5,556,591 A | 9/1996 | Jallerat et al. |
| 5,575,963 A | 11/1996 | Soifer et al. |
| 5,597,732 A | 1/1997 | Bryan-Brown |
| 5,607,593 A | 3/1997 | Cote et al. |
| 5,626,755 A | 5/1997 | Keyser et al. |
| 5,629,084 A | 5/1997 | Moya |
| 5,633,163 A | 5/1997 | Cameron |
| 5,639,373 A | 6/1997 | Mahendran et al. |
| 5,643,455 A | 7/1997 | Kopp et al. |
| 5,647,988 A | 7/1997 | Kawanishi et al. |
| 5,670,053 A | 9/1997 | Collentro et al. |
| 5,677,360 A | 10/1997 | Yamamori et al. |
| 5,688,460 A | 11/1997 | Ruschke |
| 5,690,830 A | 11/1997 | Ohtani et al. |
| 5,733,456 A | 3/1998 | Okey et al. |
| 5,744,037 A | 4/1998 | Fujimura et al. |
| 5,747,605 A | 5/1998 | Breant et al. |
| 5,766,479 A | 6/1998 | Collentro et al. |
| D396,046 S | 7/1998 | Scheel et al. |
| 5,783,083 A | 7/1998 | Henshaw et al. |
| 5,786,528 A | 7/1998 | Dileo et al. |
| D396,726 S | 8/1998 | Sadr et al. |
| 5,814,234 A | 9/1998 | Bower et al. |
| D400,890 S | 11/1998 | Gambardella |
| 5,843,069 A | 12/1998 | Butler et al. |
| 5,846,424 A | 12/1998 | Khudenko |
| 5,846,425 A | 12/1998 | Whiteman |
| 5,871,823 A | 2/1999 | Anders et al. |
| 5,888,401 A | 3/1999 | Nguyen |
| 5,895,521 A | 4/1999 | Otsuka et al. |
| 5,895,570 A | 4/1999 | Liang |
| 5,906,739 A | 5/1999 | Osterland et al. |
| 5,906,742 A | 5/1999 | Wang et al. |
| 5,910,250 A | 6/1999 | Mahendran et al. |
| 5,914,039 A | 6/1999 | Mahendran et al. |
| 5,918,264 A | 6/1999 | Drummond et al. |
| 5,942,113 A | 8/1999 | Morimura |
| 5,944,997 A | 8/1999 | Pedersen et al. |
| 5,951,878 A | 9/1999 | Astrom |
| 5,958,243 A | 9/1999 | Lawrence et al. |
| 5,961,830 A | 10/1999 | Barnett |
| 5,968,357 A | 10/1999 | Doelle et al. |
| 5,988,400 A | 11/1999 | Karachevtcev et al. |
| 5,989,428 A | 11/1999 | Goronszy |
| 5,997,745 A | 12/1999 | Tonelli et al. |
| 6,001,254 A | 12/1999 | Espenan et al. |
| 6,007,712 A | 12/1999 | Tanaka et al. |
| 6,017,451 A | 1/2000 | Kopf |
| 6,024,872 A | 2/2000 | Mahendran et al. |
| 6,036,030 A | 3/2000 | Stone et al. |
| 6,039,872 A | 3/2000 | Wu et al. |
| 6,042,677 A | 3/2000 | Mahendran et al. |
| 6,045,698 A | 4/2000 | Cote et al. |
| 6,045,899 A | 4/2000 | Wang et al. |
| 6,048,454 A | 4/2000 | Jenkins |
| 6,048,455 A | 4/2000 | Janik |
| 6,066,401 A | 5/2000 | Stilburn |
| 6,071,404 A | 6/2000 | Tsui |
| 6,074,718 A | 6/2000 | Puglia et al. |
| 6,077,435 A | 6/2000 | Beck et al. |
| 6,083,381 A | 7/2000 | Connelly et al. |
| 6,083,393 A | 7/2000 | Wu et al. |
| 6,096,213 A | 8/2000 | Radovanovic et al. |
| 6,113,782 A | 9/2000 | Leonard |
| 6,120,688 A | 9/2000 | Daly et al. |
| 6,126,819 A | 10/2000 | Heine et al. |
| 6,146,747 A | 11/2000 | Wang et al. |
| 6,149,817 A | 11/2000 | Peterson et al. |
| 6,156,200 A | 12/2000 | Zha et al. |
| 6,159,373 A | 12/2000 | Beck et al. |
| 6,162,020 A | 12/2000 | Kondo |
| 6,193,890 B1 | 2/2001 | Pedersen et al. |
| 6,202,475 B1 | 3/2001 | Selbie et al. |
| 6,214,231 B1 | 4/2001 | Cote et al. |
| 6,214,232 B1 | 4/2001 | Baurmeister et al. |
| 6,217,770 B1 | 4/2001 | Haney et al. |
| 6,221,247 B1 | 4/2001 | Nemser et al. |
| 6,224,767 B1 * | 5/2001 | Fujiwara et al. .......... 210/323.1 |
| 6,245,239 B1 | 6/2001 | Cote et al. |
| 6,254,773 B1 | 7/2001 | Biltoft |
| 6,264,839 B1 | 7/2001 | Mohr et al. |
| 6,277,512 B1 | 8/2001 | Hamrock et al. |
| 6,280,626 B1 | 8/2001 | Miyashita et al. |
| 6,284,135 B1 | 9/2001 | Ookata |
| 6,290,756 B1 | 9/2001 | Macheras et al. |
| 6,294,039 B1 | 9/2001 | Mahendran et al. |
| 6,299,773 B1 | 10/2001 | Takamura et al. |
| 6,303,026 B1 | 10/2001 | Lindbo |
| 6,303,035 B1 | 10/2001 | Cote et al. |
| 6,315,895 B1 | 11/2001 | Summerton et al. |
| 6,319,411 B1 | 11/2001 | Cote |
| 6,322,703 B1 | 11/2001 | Taniguchi et al. |
| 6,324,898 B1 | 12/2001 | Cote et al. |
| 6,325,928 B1 | 12/2001 | Pedersen et al. |
| 6,325,938 B1 | 12/2001 | Miyashita et al. |
| 6,331,248 B1 | 12/2001 | Taniguchi et al. |
| 6,337,018 B1 | 1/2002 | Mickols |
| RE37,549 E | 2/2002 | Mahendran et al. |
| 6,349,835 B1 | 2/2002 | Saux et al. |
| 6,354,444 B1 | 3/2002 | Mahendran et al. |
| 6,361,695 B1 | 3/2002 | Husain et al. |
| 6,368,819 B1 | 4/2002 | Gaddy et al. |
| 6,372,138 B1 | 4/2002 | Cho et al. |
| 6,375,848 B1 | 4/2002 | Cote et al. |
| 6,383,369 B2 | 5/2002 | Elston |
| 6,387,189 B1 | 5/2002 | Groschl et al. |
| 6,402,955 B2 | 6/2002 | Ookata |
| 6,406,629 B1 | 6/2002 | Husain et al. |
| 6,423,214 B1 | 7/2002 | Lindbo |
| 6,423,784 B1 | 7/2002 | Hamrock et al. |
| 6,432,310 B1 | 8/2002 | Andou et al. |
| 6,440,303 B2 | 8/2002 | Spriegel |
| D462,699 S | 9/2002 | Johnson et al. |
| 6,444,124 B1 | 9/2002 | Onyeche et al. |
| 6,468,430 B1 | 10/2002 | Kimura et al. |
| 6,471,869 B1 | 10/2002 | Yanou et al. |
| 6,485,645 B1 | 11/2002 | Husain et al. |
| 6,495,041 B2 | 12/2002 | Taniguchi et al. |
| 6,517,723 B1 | 2/2003 | Daigger et al. |
| 6,524,481 B2 | 2/2003 | Zha et al. |
| 6,524,733 B1 | 2/2003 | Nonobe |
| 6,550,747 B2 | 4/2003 | Rabie et al. |
| 6,555,005 B1 | 4/2003 | Zha et al. |
| 6,562,237 B1 | 5/2003 | Olaopa |
| 6,576,136 B1 | 6/2003 | De Moel et al. |
| 6,592,762 B2 | 7/2003 | Smith |
| D478,913 S | 8/2003 | Johnson et al. |
| 6,613,222 B2 | 9/2003 | Mikkelson et al. |
| 6,620,319 B2 | 9/2003 | Behmann et al. |
| 6,623,643 B2 | 9/2003 | Chisholm et al. |
| 6,627,082 B2 | 9/2003 | Del Vecchio et al. |
| 6,632,358 B1 | 10/2003 | Suga et al. |
| 6,635,179 B1 | 10/2003 | Summerton et al. |
| 6,641,733 B2 | 11/2003 | Zha et al. |
| 6,645,374 B2 | 11/2003 | Cote et al. |
| 6,656,356 B2 | 12/2003 | Gungerich et al. |
| 6,682,652 B2 | 1/2004 | Mahendran et al. |
| 6,685,832 B2 | 2/2004 | Mahendran et al. |
| 6,696,465 B2 | 2/2004 | Dellaria et al. |
| 6,702,561 B2 | 3/2004 | Stillig et al. |
| 6,706,185 B2 | 3/2004 | Goel et al. |

(56) References Cited

U.S. PATENT DOCUMENTS

| | | |
|---|---|---|
| 6,706,189 B2 | 3/2004 | Rabie et al. |
| 6,708,957 B2 | 3/2004 | Cote et al. |
| 6,712,970 B1 | 3/2004 | Trivedi |
| 6,721,529 B2 | 4/2004 | Chen et al. |
| 6,723,242 B1 | 4/2004 | Ohkata et al. |
| 6,723,758 B2 | 4/2004 | Stone et al. |
| 6,727,305 B1 | 4/2004 | Pavez Aranguiz |
| 6,743,362 B1 | 6/2004 | Porteous et al. |
| 6,755,894 B2 | 6/2004 | Bikson et al. |
| 6,755,970 B1 | 6/2004 | Knappe et al. |
| 6,758,972 B2 | 7/2004 | Vriens et al. |
| 6,761,826 B2 | 7/2004 | Bender |
| 6,770,202 B1 | 8/2004 | Kidd et al. |
| 6,780,466 B2 | 8/2004 | Grangeon et al. |
| 6,783,008 B2 | 8/2004 | Zha et al. |
| 6,790,347 B2 | 9/2004 | Jeong et al. |
| 6,790,912 B2 | 9/2004 | Blong |
| 6,805,806 B2 | 10/2004 | Arnaud |
| 6,808,629 B2 | 10/2004 | Wouters-Wasiak et al. |
| 6,811,696 B2 | 11/2004 | Wang et al. |
| 6,814,861 B2 | 11/2004 | Husain et al. |
| 6,821,420 B2 | 11/2004 | Zha et al. |
| 6,830,782 B2 | 12/2004 | Kanazawa |
| 6,840,251 B2 | 1/2005 | Gill et al. |
| 6,841,070 B2 | 1/2005 | Zha et al. |
| 6,861,466 B2 | 3/2005 | Dadalas et al. |
| 6,863,816 B2 | 3/2005 | Austin et al. |
| 6,863,817 B2 | 3/2005 | Liu et al. |
| 6,863,818 B2 | 3/2005 | Daigger et al. |
| 6,863,823 B2 | 3/2005 | Cote |
| 6,869,534 B2 | 3/2005 | McDowell et al. |
| 6,872,305 B2 | 3/2005 | Johnson et al. |
| 6,881,343 B2 | 4/2005 | Rabie et al. |
| 6,884,350 B2 | 4/2005 | Muller |
| 6,884,375 B2 | 4/2005 | Wang et al. |
| 6,890,435 B2 | 5/2005 | Ji et al. |
| 6,890,645 B2 | 5/2005 | Disse et al. |
| 6,893,568 B1 | 5/2005 | Janson et al. |
| 6,899,812 B2 | 5/2005 | Cote et al. |
| 6,936,085 B2 | 8/2005 | DeMarco |
| 6,946,073 B2 | 9/2005 | Daigger et al. |
| 6,952,258 B2 | 10/2005 | Ebert et al. |
| 6,955,762 B2 | 10/2005 | Gallagher et al. |
| 6,962,258 B2 | 11/2005 | Zha et al. |
| 6,964,741 B2 | 11/2005 | Mahendran et al. |
| 6,969,465 B2 | 11/2005 | Zha et al. |
| 6,974,554 B2 | 12/2005 | Cox et al. |
| 6,994,867 B1 | 2/2006 | Hossainy et al. |
| 7,005,100 B2 | 2/2006 | Lowell |
| 7,014,763 B2 | 3/2006 | Johnson et al. |
| 7,018,530 B2 | 3/2006 | Pollock |
| 7,018,533 B2 | 3/2006 | Johnson et al. |
| 7,022,233 B2 | 4/2006 | Chen |
| 7,041,728 B2 | 5/2006 | Zipplies et al. |
| 7,052,610 B2 | 5/2006 | Janson et al. |
| 7,083,733 B2 | 8/2006 | Freydina et al. |
| 7,087,173 B2 | 8/2006 | Cote et al. |
| 7,122,121 B1 | 10/2006 | Ji |
| 7,147,777 B1 | 12/2006 | Porteous |
| 7,147,778 B1 | 12/2006 | DiMassimo et al. |
| 7,160,455 B2 | 1/2007 | Taniguchi et al. |
| 7,160,463 B2 | 1/2007 | Beck et al. |
| 7,160,464 B2 | 1/2007 | Lee et al. |
| 7,172,699 B1 | 2/2007 | Trivedi et al. |
| 7,172,701 B2 | 2/2007 | Gaid et al. |
| 7,186,344 B2 | 3/2007 | Hughes |
| 7,208,091 B2 | 4/2007 | Pind et al. |
| 7,223,340 B2 | 5/2007 | Zha et al. |
| 7,226,541 B2 | 6/2007 | Muller et al. |
| 7,247,238 B2 | 7/2007 | Mulletie et al. |
| 7,255,788 B2 | 8/2007 | Okazaki et al. |
| 7,264,716 B2 | 9/2007 | Johnson et al. |
| 7,279,100 B2 | 10/2007 | Devine |
| 7,279,215 B2 | 10/2007 | Hester et al. |
| 7,300,022 B2 | 11/2007 | Muller |
| 7,314,563 B2 | 1/2008 | Cho et al. |
| 7,329,344 B2 | 2/2008 | Jordan et al. |
| 7,344,645 B2 | 3/2008 | Beck et al. |
| 7,361,274 B2 | 4/2008 | Lazaredes |
| 7,378,024 B2 | 5/2008 | Bartels et al. |
| 7,387,723 B2 | 6/2008 | Jordan |
| 7,404,896 B2 | 7/2008 | Muller |
| 7,410,584 B2 | 8/2008 | Devine |
| 7,455,765 B2 | 11/2008 | Elefritz et al. |
| 7,481,933 B2 | 1/2009 | Barnes |
| 7,507,274 B2 | 3/2009 | Tonkovich et al. |
| 7,510,655 B2 | 3/2009 | Barnes |
| 7,531,042 B2 | 5/2009 | Murkute et al. |
| 7,563,363 B2 | 7/2009 | Kuzma |
| 7,591,950 B2 | 9/2009 | Zha et al. |
| 7,632,439 B2 | 12/2009 | Mullette et al. |
| 7,648,634 B2 | 1/2010 | Probst |
| 7,662,212 B2 | 2/2010 | Mullette et al. |
| 7,708,887 B2 | 5/2010 | Johnson et al. |
| 7,713,413 B2 | 5/2010 | Barnes |
| 7,718,057 B2 | 5/2010 | Jordan et al. |
| 7,718,065 B2 | 5/2010 | Jordan |
| 7,722,769 B2 | 5/2010 | Jordan et al. |
| 7,761,826 B1 | 7/2010 | Thanvantri et al. |
| 7,819,956 B2 | 10/2010 | Muller |
| 7,850,851 B2 | 12/2010 | Zha et al. |
| 7,862,719 B2 | 1/2011 | McMahon et al. |
| 7,931,463 B2 | 4/2011 | Cox et al. |
| 7,938,966 B2 | 5/2011 | Johnson |
| 8,002,246 B2 | 8/2011 | Eguchi et al. |
| 8,197,688 B2 | 6/2012 | Sakashita et al. |
| 8,372,282 B2 | 2/2013 | Zha et al. |
| 8,506,806 B2 | 8/2013 | Beck et al. |
| 9,022,224 B2 | 5/2015 | Collignon et al. |
| 2001/0027951 A1 | 10/2001 | Gungerich et al. |
| 2001/0047962 A1* | 12/2001 | Zha et al. ............... 210/636 |
| 2001/0052494 A1 | 12/2001 | Cote et al. |
| 2002/0027111 A1 | 3/2002 | Ando et al. |
| 2002/0070157 A1 | 6/2002 | Yamada |
| 2002/0108906 A1 | 8/2002 | Husain et al. |
| 2002/0117444 A1 | 8/2002 | Mikkelson et al. |
| 2002/0148767 A1 | 10/2002 | Johnson et al. |
| 2002/0153313 A1 | 10/2002 | Cote |
| 2002/0185435 A1 | 12/2002 | Husain et al. |
| 2002/0189999 A1 | 12/2002 | Espenan et al. |
| 2002/0195390 A1 | 12/2002 | Zha et al. |
| 2003/0038075 A1 | 2/2003 | Akimoto et al. |
| 2003/0038080 A1 | 2/2003 | Vriens et al. |
| 2003/0042199 A1 | 3/2003 | Smith |
| 2003/0052055 A1 | 3/2003 | Akamatsu et al. |
| 2003/0056919 A1 | 3/2003 | Beck |
| 2003/0057155 A1 | 3/2003 | Husain et al. |
| 2003/0062301 A1 | 4/2003 | Merrie et al. |
| 2003/0075495 A1 | 4/2003 | Dannstrom et al. |
| 2003/0075504 A1 | 4/2003 | Zha et al. |
| 2003/0121855 A1 | 7/2003 | Kopp |
| 2003/0127388 A1 | 7/2003 | Ando et al. |
| 2003/0146153 A1 | 8/2003 | Cote et al. |
| 2003/0150807 A1 | 8/2003 | Bartels et al. |
| 2003/0159988 A1 | 8/2003 | Daigger et al. |
| 2003/0173706 A1 | 9/2003 | Rabie et al. |
| 2003/0178365 A1 | 9/2003 | Zha et al. |
| 2003/0196955 A1 | 10/2003 | Hughes |
| 2003/0205519 A1 | 11/2003 | Zha et al. |
| 2003/0226797 A1 | 12/2003 | Phelps |
| 2003/0234221 A1 | 12/2003 | Johnson et al. |
| 2004/0007523 A1 | 1/2004 | Gabon et al. |
| 2004/0007525 A1 | 1/2004 | Rabie et al. |
| 2004/0035770 A1 | 2/2004 | Edwards et al. |
| 2004/0035779 A1 | 2/2004 | Vossenkaul et al. |
| 2004/0045893 A1 | 3/2004 | Watanabe et al. |
| 2004/0050791 A1 | 3/2004 | Herczeg |
| 2004/0055974 A1 | 3/2004 | Del Vecchio et al. |
| 2004/0084369 A1 | 5/2004 | Zha et al. |
| 2004/0108268 A1 | 6/2004 | Liu et al. |
| 2004/0112831 A1 | 6/2004 | Rabie et al. |
| 2004/0118779 A1 | 6/2004 | Rawson et al. |
| 2004/0129637 A1 | 7/2004 | Husain et al. |
| 2004/0139992 A1 | 7/2004 | Murkute et al. |

(56) References Cited

U.S. PATENT DOCUMENTS

| | | |
|---|---|---|
| 2004/0145076 A1 | 7/2004 | Zha et al. |
| 2004/0149655 A1 | 8/2004 | Petrucco et al. |
| 2004/0154671 A1 | 8/2004 | Martins et al. |
| 2004/0168978 A1 | 9/2004 | Gray |
| 2004/0168979 A1 | 9/2004 | Zha et al. |
| 2004/0173525 A1 | 9/2004 | Hunniford et al. |
| 2004/0178136 A1 | 9/2004 | Taniguchi et al. |
| 2004/0178154 A1 | 9/2004 | Zha et al. |
| 2004/0188339 A1 | 9/2004 | Murkute et al. |
| 2004/0188341 A1 | 9/2004 | Zha et al. |
| 2004/0211726 A1 | 10/2004 | Baig et al. |
| 2004/0217053 A1 | 11/2004 | Zha et al. |
| 2004/0222158 A1 | 11/2004 | Husain et al. |
| 2004/0232076 A1 | 11/2004 | Zha et al. |
| 2004/0238442 A1 | 12/2004 | Johnson et al. |
| 2004/0245174 A1 | 12/2004 | Takayama et al. |
| 2005/0000885 A1 | 1/2005 | Stockbower |
| 2005/0006308 A1 | 1/2005 | Cote et al. |
| 2005/0023219 A1 | 2/2005 | Kirker et al. |
| 2005/0029185 A1 | 2/2005 | Muller |
| 2005/0029186 A1 | 2/2005 | Muller |
| 2005/0032982 A1 | 2/2005 | Muller |
| 2005/0045557 A1 | 3/2005 | Daigger et al. |
| 2005/0053878 A1 | 3/2005 | Bruun et al. |
| 2005/0061725 A1 | 3/2005 | Liu et al. |
| 2005/0077227 A1 | 4/2005 | Kirker et al. |
| 2005/0098494 A1 | 5/2005 | Mullette et al. |
| 2005/0103722 A1 | 5/2005 | Freydina et al. |
| 2005/0109692 A1 | 5/2005 | Zha et al. |
| 2005/0115880 A1 | 6/2005 | Pollock |
| 2005/0115899 A1 | 6/2005 | Liu et al. |
| 2005/0121389 A1 | 6/2005 | Janson et al. |
| 2005/0126963 A1 | 6/2005 | Phagoo et al. |
| 2005/0139538 A1 | 6/2005 | Lazaredes |
| 2005/0161389 A1 | 7/2005 | Takeda et al. |
| 2005/0184008 A1 | 8/2005 | Schacht et al. |
| 2005/0194305 A1 | 9/2005 | Vido et al. |
| 2005/0194310 A1 | 9/2005 | Yamamoto et al. |
| 2005/0194315 A1 | 9/2005 | Adams et al. |
| 2005/0258098 A1 | 11/2005 | Vincent et al. |
| 2006/0000775 A1 | 1/2006 | Zha et al. |
| 2006/0021929 A1 | 2/2006 | Mannheim et al. |
| 2006/0033222 A1 | 2/2006 | Godfrey et al. |
| 2006/0049093 A1* | 3/2006 | Chikura et al. .......... 210/321.83 |
| 2006/0065596 A1 | 3/2006 | Kent et al. |
| 2006/0081533 A1 | 4/2006 | Khudenko |
| 2006/0091074 A1 | 5/2006 | Pedersen et al. |
| 2006/0131234 A1 | 6/2006 | Zha et al. |
| 2006/0151373 A1 | 7/2006 | Szabo et al. |
| 2006/0201876 A1 | 9/2006 | Jordan |
| 2006/0201879 A1 | 9/2006 | Den Boestert et al. |
| 2006/0249448 A1 | 11/2006 | Fujishima et al. |
| 2006/0249449 A1 | 11/2006 | Nakhla et al. |
| 2006/0261007 A1 | 11/2006 | Zha et al. |
| 2006/0273007 A1 | 12/2006 | Zha et al. |
| 2006/0273038 A1 | 12/2006 | Syed et al. |
| 2007/0007205 A1 | 1/2007 | Johnson et al. |
| 2007/0007207 A1 | 1/2007 | Mahendran et al. |
| 2007/0007214 A1 | 1/2007 | Zha et al. |
| 2007/0039888 A1 | 2/2007 | Ginzburg et al. |
| 2007/0045183 A1 | 3/2007 | Murphy |
| 2007/0051679 A1 | 3/2007 | Adams et al. |
| 2007/0056904 A1 | 3/2007 | Hogt et al. |
| 2007/0056905 A1 | 3/2007 | Beck et al. |
| 2007/0075017 A1 | 4/2007 | Kuzma |
| 2007/0075021 A1 | 4/2007 | Johnson |
| 2007/0084791 A1 | 4/2007 | Jordan et al. |
| 2007/0084795 A1 | 4/2007 | Jordan |
| 2007/0095741 A1* | 5/2007 | Berends .................. 210/321.6 |
| 2007/0102339 A1 | 5/2007 | Cote et al. |
| 2007/0108125 A1 | 5/2007 | Cho et al. |
| 2007/0131614 A1 | 6/2007 | Knappe et al. |
| 2007/0138090 A1 | 6/2007 | Jordan et al. |
| 2007/0163942 A1 | 7/2007 | Tanaka et al. |
| 2007/0170112 A1 | 7/2007 | Elefritz et al. |
| 2007/0181496 A1 | 8/2007 | Zuback |
| 2007/0227973 A1 | 10/2007 | Zha et al. |
| 2008/0011675 A1 | 1/2008 | Kedziora |
| 2008/0053923 A1 | 3/2008 | Beck et al. |
| 2008/0093297 A1 | 4/2008 | Gock et al. |
| 2008/0156745 A1 | 7/2008 | Zha et al. |
| 2008/0179249 A1 | 7/2008 | Beck et al. |
| 2008/0190846 A1* | 8/2008 | Cox et al. .................. 210/636 |
| 2008/0203016 A1 | 8/2008 | Johnson et al. |
| 2008/0203017 A1 | 8/2008 | Zha et al. |
| 2008/0257822 A1 | 10/2008 | Johnson |
| 2008/0277340 A1 | 11/2008 | Hong et al. |
| 2009/0001018 A1 | 1/2009 | Zha et al. |
| 2009/0194477 A1 | 8/2009 | Hashimoto |
| 2009/0223895 A1 | 9/2009 | Zha et al. |
| 2009/0255873 A1 | 10/2009 | Biltoft et al. |
| 2010/0000941 A1 | 1/2010 | Muller |
| 2010/0012585 A1 | 1/2010 | Zha et al. |
| 2010/0025320 A1 | 2/2010 | Johnson |
| 2010/0051545 A1 | 3/2010 | Johnson et al. |
| 2010/0170847 A1 | 7/2010 | Zha et al. |
| 2010/0200503 A1 | 8/2010 | Zha et al. |
| 2010/0300968 A1 | 12/2010 | Liu et al. |
| 2010/0326906 A1 | 12/2010 | Barnes |
| 2011/0023913 A1 | 2/2011 | Fulling |
| 2011/0049047 A1 | 3/2011 | Cumin et al. |
| 2011/0049048 A1 | 3/2011 | Benner et al. |
| 2011/0056522 A1 | 3/2011 | Zauner et al. |
| 2011/0100907 A1 | 5/2011 | Zha et al. |
| 2011/0114557 A2 | 5/2011 | Johnson et al. |
| 2011/0127209 A1 | 6/2011 | Rogers et al. |
| 2011/0132826 A1 | 6/2011 | Muller et al. |
| 2011/0139715 A1 | 6/2011 | Zha et al. |
| 2011/0147298 A1 | 6/2011 | Kennedy et al. |
| 2011/0192783 A1 | 8/2011 | Cox et al. |
| 2011/0198283 A1 | 8/2011 | Zha et al. |
| 2012/0074053 A1 | 3/2012 | Collignon et al. |
| 2012/0091602 A1 | 4/2012 | Cumin et al. |
| 2012/0097601 A1 | 4/2012 | Lee et al. |
| 2012/0103904 A1 | 5/2012 | Morita et al. |
| 2012/0187044 A1 | 7/2012 | Zha et al. |
| 2012/0285885 A1 | 11/2012 | James et al. |
| 2013/0056426 A1 | 3/2013 | Barnes |
| 2013/0153496 A1 | 6/2013 | Zha et al. |
| 2013/0168307 A1 | 7/2013 | Drivarbekk et al. |
| 2014/0174998 A1 | 6/2014 | Aerts et al. |
| 2015/0136686 A1 | 5/2015 | Chen |

FOREIGN PATENT DOCUMENTS

| | | |
|---|---|---|
| AU | 77066/87 A | 2/1988 |
| AU | 762091 B2 | 6/2003 |
| AU | 2004289373 A1 | 5/2005 |
| CA | 2460207 A1 | 3/2003 |
| CA | 2531764 A1 | 3/2005 |
| CN | 86104888 A | 2/1988 |
| CN | 1050770 | 1/1995 |
| CN | 2204898 Y | 8/1995 |
| CN | 2236049 Y | 9/1996 |
| CN | 1159769 A | 9/1997 |
| CN | 1244814 A | 2/2000 |
| CN | 1249698 A | 4/2000 |
| CN | 1265636 A | 9/2000 |
| CN | 1319032 A | 10/2001 |
| CN | 1468140 A | 1/2004 |
| CN | 1541757 A | 11/2004 |
| DE | 3904544 A1 | 8/1990 |
| DE | 4117281 A1 | 1/1992 |
| DE | 4113420 A1 | 10/1992 |
| DE | 4117422 C1 | 11/1992 |
| DE | 4326603 A1 | 2/1995 |
| DE | 19503060 A1 | 8/1996 |
| DE | 19718028 C1 | 6/1998 |
| DE | 29804927 U1 | 6/1998 |
| DE | 29906389 U1 | 6/1999 |
| DE | 10045227 C1 | 2/2002 |
| DE | 10209170 C1 | 8/2003 |
| DE | 202004012693 U1 | 10/2004 |
| EP | 0012557 A1 | 6/1980 |

(56) References Cited

FOREIGN PATENT DOCUMENTS

| | | |
|---|---|---|
| EP | 0038612 B1 | 10/1981 |
| EP | 012557 B1 | 2/1983 |
| EP | 0090383 A2 | 10/1983 |
| EP | 126714 A2 | 11/1984 |
| EP | 050447 B1 | 10/1985 |
| EP | 194735 A2 | 9/1986 |
| EP | 250337 A1 | 12/1987 |
| EP | 327025 A1 | 8/1989 |
| EP | 344633 A1 | 12/1989 |
| EP | 090383 B1 | 5/1990 |
| EP | 407900 A2 | 1/1991 |
| EP | 463627 A2 | 1/1992 |
| EP | 0464321 A1 | 1/1992 |
| EP | 492942 A2 | 7/1992 |
| EP | 518250 B1 | 12/1992 |
| EP | 547575 A1 | 6/1993 |
| EP | 280052 B1 | 7/1994 |
| EP | 395133 B1 | 2/1995 |
| EP | 662341 A1 | 7/1995 |
| EP | 492446 B1 | 11/1995 |
| EP | 430082 B1 | 6/1996 |
| EP | 734758 A1 | 10/1996 |
| EP | 763758 A1 | 3/1997 |
| EP | 824956 A2 | 2/1998 |
| EP | 848194 A2 | 6/1998 |
| EP | 855214 A1 | 7/1998 |
| EP | 627255 B1 | 1/1999 |
| EP | 911073 A1 | 4/1999 |
| EP | 920904 A2 | 6/1999 |
| EP | 0937494 A2 | 8/1999 |
| EP | 1034835 A1 | 9/2000 |
| EP | 1052012 A1 | 11/2000 |
| EP | 1156015 A1 | 11/2001 |
| EP | 1300186 A1 | 4/2003 |
| EP | 1349644 B1 | 10/2003 |
| EP | 1350555 A1 | 10/2003 |
| EP | 1236503 B1 | 8/2004 |
| EP | 1445240 | 8/2004 |
| EP | 1466658 A1 | 10/2004 |
| EP | 1659171 A1 | 5/2006 |
| EP | 1420874 B1 | 1/2011 |
| FR | 2620712 A1 | 3/1989 |
| FR | 2674448 A1 | 10/1992 |
| FR | 2699424 A1 | 6/1994 |
| FR | 2762834 A1 | 11/1998 |
| GB | 702911 A | 1/1954 |
| GB | 996195 A | 6/1965 |
| GB | 2253572 A | 9/1992 |
| JP | 52-078677 A | 7/1977 |
| JP | 53-5077 | 1/1978 |
| JP | 53108882 A | 9/1978 |
| JP | 54162684 A | 12/1979 |
| JP | 55099703 A | 7/1980 |
| JP | 55129107 A | 10/1980 |
| JP | 55129155 A | 10/1980 |
| JP | 56021604 A | 2/1981 |
| JP | 56118701 A | 9/1981 |
| JP | 56121685 A | 9/1981 |
| JP | 57190697 A | 11/1982 |
| JP | 58088007 A | 5/1983 |
| JP | 60019002 A | 1/1985 |
| JP | 60206412 A | 10/1985 |
| JP | 60260628 A | 12/1985 |
| JP | 61097005 A | 5/1986 |
| JP | 61097006 A | 5/1986 |
| JP | 61107905 A | 5/1986 |
| JP | 61167406 A | 7/1986 |
| JP | 61167407 A | 7/1986 |
| JP | 61171504 A | 8/1986 |
| JP | 61192309 A | 8/1986 |
| JP | 61222510 A | 10/1986 |
| JP | 61242607 A | 10/1986 |
| JP | 61249505 A | 11/1986 |
| JP | 61257203 A | 11/1986 |
| JP | 61263605 A | 11/1986 |
| JP | 61291007 A | 12/1986 |
| JP | 61293504 A | 12/1986 |
| JP | 62004408 A | 1/1987 |
| JP | 62068828 A | 3/1987 |
| JP | 62114609 A | 5/1987 |
| JP | 62140607 A | 6/1987 |
| JP | 62144708 A | 6/1987 |
| JP | 62163708 A | 7/1987 |
| JP | 62179540 A | 8/1987 |
| JP | 62237908 A | 10/1987 |
| JP | 62250908 A | 10/1987 |
| JP | 62187606 | 11/1987 |
| JP | 62262710 A | 11/1987 |
| JP | 63-93307 | 4/1988 |
| JP | 63097634 A | 4/1988 |
| JP | 63099246 A | 4/1988 |
| JP | 63143905 A | 6/1988 |
| JP | 63-1602 | 7/1988 |
| JP | 63171607 A | 7/1988 |
| JP | 63180254 A | 7/1988 |
| JP | S63-38884 | 10/1988 |
| JP | 64-075542 A | 3/1989 |
| JP | 1-501046 T | 4/1989 |
| JP | 1111494 A | 4/1989 |
| JP | 01151906 A | 6/1989 |
| JP | 01-307409 | 12/1989 |
| JP | 02-017925 | 1/1990 |
| JP | 02017924 | 1/1990 |
| JP | 02026625 A | 1/1990 |
| JP | 02031200 A | 2/1990 |
| JP | 02040296 A | 2/1990 |
| JP | 02107318 A | 4/1990 |
| JP | 02126922 A | 5/1990 |
| JP | 02144132 A | 6/1990 |
| JP | 02164423 A | 6/1990 |
| JP | 02174918 A | 7/1990 |
| JP | 02241523 A | 9/1990 |
| JP | 02277528 A | 11/1990 |
| JP | 02284035 A | 11/1990 |
| JP | 03018373 A | 1/1991 |
| JP | 03028797 A | 2/1991 |
| JP | 03-086529 A | 4/1991 |
| JP | 03110445 A | 5/1991 |
| JP | 04108518 A | 4/1992 |
| JP | 04110023 A | 4/1992 |
| JP | 4-190889 A | 7/1992 |
| JP | 04187224 A | 7/1992 |
| JP | 4-256425 A | 9/1992 |
| JP | 04250898 A | 9/1992 |
| JP | 04256424 A | 9/1992 |
| JP | 04265128 A | 9/1992 |
| JP | 04293527 A | 10/1992 |
| JP | 04310223 A | 11/1992 |
| JP | 04317793 A | 11/1992 |
| JP | 04334530 A | 11/1992 |
| JP | 04348252 A | 12/1992 |
| JP | 05-4030 | 1/1993 |
| JP | 05023557 A | 2/1993 |
| JP | 05096136 A | 4/1993 |
| JP | 05137977 A | 6/1993 |
| JP | 05157654 A | 6/1993 |
| JP | 05161831 A | 6/1993 |
| JP | 05184884 A | 7/1993 |
| JP | 05279447 A | 10/1993 |
| JP | 05285348 A | 11/1993 |
| JP | 05305221 A | 11/1993 |
| JP | 06-027215 | 2/1994 |
| JP | 06071120 A | 3/1994 |
| JP | 06114240 A | 4/1994 |
| JP | 06170364 A | 6/1994 |
| JP | 06190250 A | 7/1994 |
| JP | 06218237 A | 8/1994 |
| JP | 06238273 A | 8/1994 |
| JP | 06-292820 A | 10/1994 |
| JP | 06277469 A | 10/1994 |
| JP | 06285496 A | 10/1994 |
| JP | 06343837 A | 12/1994 |
| JP | 07000770 A | 1/1995 |
| JP | 07024272 A | 1/1995 |

(56) References Cited

FOREIGN PATENT DOCUMENTS

| | | |
|---|---|---|
| JP | 07047247 A | 2/1995 |
| JP | 07068139 A | 3/1995 |
| JP | 07136470 A | 5/1995 |
| JP | 07136471 A | 5/1995 |
| JP | 07155564 A | 6/1995 |
| JP | 07155758 A | 6/1995 |
| JP | 7-39921 | 7/1995 |
| JP | 07178323 A | 7/1995 |
| JP | 07185268 A | 7/1995 |
| JP | 07185270 A | 7/1995 |
| JP | 07185271 A | 7/1995 |
| JP | 07185272 A | 7/1995 |
| JP | 07204635 A | 8/1995 |
| JP | 07236819 A | 9/1995 |
| JP | 07251043 A | 10/1995 |
| JP | 07256253 | 10/1995 |
| JP | 07275665 A | 10/1995 |
| JP | 07289860 A | 11/1995 |
| JP | 07303895 A | 11/1995 |
| JP | 07313973 A | 12/1995 |
| JP | 08010585 A | 1/1996 |
| JP | 8039089 A | 2/1996 |
| JP | 08197053 A | 8/1996 |
| JP | 08323161 A | 12/1996 |
| JP | 08332357 A | 12/1996 |
| JP | 09000890 A | 1/1997 |
| JP | 09038470 A | 2/1997 |
| JP | 09038648 A | 2/1997 |
| JP | 09072993 A | 3/1997 |
| JP | 09075689 A | 3/1997 |
| JP | 09099227 A | 4/1997 |
| JP | 09103655 A | 4/1997 |
| JP | 09103661 A | 4/1997 |
| JP | 9117647 A | 5/1997 |
| JP | 9138298 A | 5/1997 |
| JP | 09141063 A | 6/1997 |
| JP | 09155345 A | 6/1997 |
| JP | 09187628 A | 7/1997 |
| JP | 09192458 A | 7/1997 |
| JP | 09220569 A | 8/1997 |
| JP | 09271641 A | 10/1997 |
| JP | 09313902 A | 12/1997 |
| JP | 09324067 A | 12/1997 |
| JP | 10015365 A | 1/1998 |
| JP | 10024222 A | 1/1998 |
| JP | 10033955 A | 2/1998 |
| JP | 10048466 A | 2/1998 |
| JP | 10066972 A | 3/1998 |
| JP | 10076144 A | 3/1998 |
| JP | 10076264 A | 3/1998 |
| JP | 10085562 A | 4/1998 |
| JP | 10085565 A | 4/1998 |
| JP | 10085566 A | 4/1998 |
| JP | 10156149 A | 6/1998 |
| JP | 10180048 A | 7/1998 |
| JP | 10225685 A | 8/1998 |
| JP | 10235168 A | 9/1998 |
| JP | 10249171 A | 9/1998 |
| JP | 10286441 A | 10/1998 |
| JP | 10328538 A | 12/1998 |
| JP | 11005023 A | 1/1999 |
| JP | 11028339 A | 2/1999 |
| JP | 11028467 A | 2/1999 |
| JP | 11031025 A | 2/1999 |
| JP | 11033365 A | 2/1999 |
| JP | 11033367 A | 2/1999 |
| JP | 11076769 A | 3/1999 |
| JP | 11076770 A | 3/1999 |
| JP | 11090189 A | 4/1999 |
| JP | 11156166 A | 6/1999 |
| JP | 11156360 A | 6/1999 |
| JP | 11165200 A | 6/1999 |
| JP | 11179171 A | 7/1999 |
| JP | 11300177 A | 11/1999 |
| JP | 11302438 A | 11/1999 |
| JP | 11309351 A | 11/1999 |
| JP | 11319501 A | 11/1999 |
| JP | 11319507 A | 11/1999 |
| JP | 11333265 A | 12/1999 |
| JP | 2000000439 A | 1/2000 |
| JP | 200051670 | 2/2000 |
| JP | 2000051669 A | 2/2000 |
| JP | 2000061466 A | 2/2000 |
| JP | 200079390 A | 3/2000 |
| JP | 2000070684 A | 3/2000 |
| JP | 2000093758 | 4/2000 |
| JP | 2000157845 | 6/2000 |
| JP | 2000157850 A | 6/2000 |
| JP | 2000185220 A | 7/2000 |
| JP | 2000189958 A | 7/2000 |
| JP | 2000233020 A | 8/2000 |
| JP | 2000237548 A | 9/2000 |
| JP | 2000300968 A | 10/2000 |
| JP | 2000317276 A | 11/2000 |
| JP | 2000334276 A | 12/2000 |
| JP | 2000342932 A | 12/2000 |
| JP | 2001009246 A | 1/2001 |
| JP | 2001070967 A | 3/2001 |
| JP | 2001079366 A | 3/2001 |
| JP | 2001079367 A | 3/2001 |
| JP | 2001104760 A | 4/2001 |
| JP | 2001120963 A | 5/2001 |
| JP | 2001-510396 T | 7/2001 |
| JP | 2001179059 A | 7/2001 |
| JP | 2001179060 A | 7/2001 |
| JP | 2001190937 A | 7/2001 |
| JP | 2001190938 A | 7/2001 |
| JP | 2001205055 A | 7/2001 |
| JP | 2001212587 A | 8/2001 |
| JP | 2001232160 A | 8/2001 |
| JP | 2001-269546 | 10/2001 |
| JP | 2002011472 A | 1/2002 |
| JP | 2002143849 A | 5/2002 |
| JP | 2002177746 A | 6/2002 |
| JP | 3302992 B2 | 7/2002 |
| JP | 2002525197 T | 8/2002 |
| JP | 2002527229 A | 8/2002 |
| JP | 2002263407 A | 9/2002 |
| JP | 2002-336663 | 11/2002 |
| JP | 2003024751 | 1/2003 |
| JP | 2003047830 A | 2/2003 |
| JP | 2003053157 A | 2/2003 |
| JP | 2003053160 A | 2/2003 |
| JP | 200371254 A | 3/2003 |
| JP | 2003062436 A | 3/2003 |
| JP | 2003135935 A | 5/2003 |
| JP | 2003190976 A | 7/2003 |
| JP | 2003-265597 | 9/2003 |
| JP | 2003-275548 | 9/2003 |
| JP | 2003266072 A | 9/2003 |
| JP | 2003275759 A | 9/2003 |
| JP | 2003340250 A | 12/2003 |
| JP | 2004008981 | 1/2004 |
| JP | 2004050011 A | 2/2004 |
| JP | 2004073950 A | 3/2004 |
| JP | 2004-230287 A | 8/2004 |
| JP | 2004216263 A | 8/2004 |
| JP | 2004230280 A | 8/2004 |
| JP | 2004249168 A | 9/2004 |
| JP | 2004322100 A | 11/2004 |
| JP | 2004-536710 A | 12/2004 |
| JP | 2004337730 A | 12/2004 |
| JP | 2005-502467 A | 1/2005 |
| JP | 2005-087887 A | 4/2005 |
| JP | 2005144291 A | 6/2005 |
| JP | 2005154551 A | 6/2005 |
| JP | 2005279447 A | 10/2005 |
| JP | 2006116495 | 5/2006 |
| JP | 2007547083 | 8/2010 |
| JP | 4833353 B2 | 12/2011 |
| KR | 20-0232145 | 7/2001 |
| KR | 1020020067227 | 8/2002 |
| KR | 20-0295350 | 11/2002 |
| KR | 2002-0090967 | 12/2002 |

(56) References Cited

FOREIGN PATENT DOCUMENTS

| | | |
|---|---|---|
| KR | 2003-033812 | 5/2003 |
| KR | 2003-060625 | 7/2003 |
| KR | 20030066271 | 8/2003 |
| KR | 20030097167 | 12/2003 |
| KR | 2005-063478 | 6/2005 |
| NL | 1006390 C2 | 12/1998 |
| NL | 1020491 C | 10/2003 |
| NL | 1021197 C | 10/2003 |
| NO | 20053769 A | 2/2006 |
| NZ | 510394 A | 5/2003 |
| NZ | 537874 A | 2/2007 |
| TW | 216773 B | 12/1993 |
| TW | 347343 | 12/1998 |
| WO | 1985001449 A1 | 4/1985 |
| WO | 1986005116 A1 | 9/1986 |
| WO | 1986005705 A1 | 10/1986 |
| WO | 8800494 A1 | 1/1988 |
| WO | 8801529 A1 | 3/1988 |
| WO | 88001895 A1 | 3/1988 |
| WO | 8806200 A1 | 8/1988 |
| WO | 8900880 A1 | 2/1989 |
| WO | 9000434 A1 | 1/1990 |
| WO | 9104783 A1 | 4/1991 |
| WO | 9116124 A1 | 10/1991 |
| WO | 9302779 A1 | 2/1993 |
| WO | 1993002779 A1 | 2/1993 |
| WO | 9315827 A1 | 8/1993 |
| WO | 9323152 A1 | 11/1993 |
| WO | 9411094 A1 | 5/1994 |
| WO | 9511736 A1 | 5/1995 |
| WO | 9534424 A1 | 12/1995 |
| WO | 9603202 A1 | 2/1996 |
| WO | 9607470 A1 | 3/1996 |
| WO | 9628236 A1 | 9/1996 |
| WO | 199629142 A1 | 9/1996 |
| WO | 9641676 A1 | 12/1996 |
| WO | 9706880 A2 | 2/1997 |
| WO | 9710046 A1 | 3/1997 |
| WO | 9822204 A1 | 5/1998 |
| WO | 9825694 A1 | 6/1998 |
| WO | 9828066 A1 | 7/1998 |
| WO | 9853902 A1 | 12/1998 |
| WO | 9901207 A1 | 1/1999 |
| WO | 9906326 A1 | 2/1999 |
| WO | 199908773 A1 | 2/1999 |
| WO | 99-55448 A1 | 11/1999 |
| WO | 9959707 A1 | 11/1999 |
| WO | 0021890 A1 | 4/2000 |
| WO | 200018498 A1 | 4/2000 |
| WO | 0030740 A1 | 6/2000 |
| WO | 200030742 A1 | 6/2000 |
| WO | 200100307 A2 | 1/2001 |
| WO | 200105715 A1 | 1/2001 |
| WO | 0108790 A1 | 2/2001 |
| WO | 200119414 A1 | 3/2001 |
| WO | 200132299 A1 | 5/2001 |
| WO | 200136075 A1 | 5/2001 |
| WO | 0143856 A1 | 6/2001 |
| WO | 200145829 A1 | 6/2001 |
| WO | 2002004100 | 1/2002 |
| WO | 0211867 A1 | 2/2002 |
| WO | 0230550 A1 | 4/2002 |
| WO | 200226363 A2 | 4/2002 |
| WO | 0238256 A1 | 5/2002 |
| WO | 2002040140 A1 | 5/2002 |
| WO | 2002047800 A1 | 6/2002 |
| WO | 2003000389 A2 | 1/2003 |
| WO | 03013706 A1 | 2/2003 |
| WO | 2003013706 A1 | 2/2003 |
| WO | 2003024575 A1 | 3/2003 |
| WO | 03053552 A1 | 7/2003 |
| WO | 03057632 A1 | 7/2003 |
| WO | 03059495 A1 | 7/2003 |
| WO | 03068374 A1 | 8/2003 |
| WO | 2003095078 A1 | 11/2003 |
| WO | 04024304 A2 | 3/2004 |
| WO | 2004018084 A1 | 3/2004 |
| WO | 2004033078 A1 | 4/2004 |
| WO | 2004050221 A1 | 6/2004 |
| WO | 2004056458 A3 | 7/2004 |
| WO | 2004078327 A1 | 9/2004 |
| WO | 2004101120 A1 | 11/2004 |
| WO | 2005005028 A1 | 1/2005 |
| WO | 2005021140 A1 | 3/2005 |
| WO | 2005023997 A1 | 3/2005 |
| WO | 2005028085 A1 | 3/2005 |
| WO | 2005028086 A1 | 3/2005 |
| WO | 2005037414 A1 | 4/2005 |
| WO | 2005046849 A1 | 5/2005 |
| WO | 2005070524 A1 | 8/2005 |
| WO | 2005077499 A1 | 8/2005 |
| WO | 2005082498 A1 | 9/2005 |
| WO | 2005107929 A2 | 11/2005 |
| WO | 2006017911 A1 | 2/2006 |
| WO | 2006026814 A1 | 3/2006 |
| WO | 2006029456 A1 | 3/2006 |
| WO | 2006029465 | 3/2006 |
| WO | 2006047814 A1 | 5/2006 |
| WO | 2006066319 A1 | 6/2006 |
| WO | 2006066350 A1 | 6/2006 |
| WO | 2006126833 A1 | 11/2006 |
| WO | 2007053528 A2 | 5/2007 |
| WO | 2007065956 A1 | 6/2007 |
| WO | 2007073080 A1 | 6/2007 |
| WO | 2007135087 A1 | 11/2007 |
| WO | 2008025077 A1 | 3/2008 |
| WO | 2008034570 A1 | 3/2008 |
| WO | 2008071516 A1 | 6/2008 |
| WO | 2008141080 A1 | 11/2008 |
| WO | 2008153818 A1 | 12/2008 |
| WO | 2009030405 A1 | 3/2009 |
| WO | 2013048801 A1 | 4/2013 |
| WO | 2013049109 A1 | 4/2013 |

OTHER PUBLICATIONS

Almulla et al., "Developments in high recovery brackish water desalination plants as part of the solution to water quantity problems," Desalination, 153 (2002), pp. 237-243.

Anonymous, "Nonwoven Constructions of Dyneon™ THV and Dyneon™ HTE Fluorothermoplastics", Research Disclosure Journal, Apr. 1999, RD 420013, 2 pages.

Cote et al. "A New Immersed Membrane for Pretreatment to Reverse Osmosis," Desalination, 139 (2001), pp. 229-236.

Cote et al., "Immersed Membranes Activated Sludge Process Applied to the Treatment of Municipal Wastewater," Wat. Sci. Tech. 38(4-5) (1998), pp. 437-442.

Coulson et al., "Coulson and Richardson's Chemical Engineering," 1999, vol. 1, pp. 358-364.

Crawford et al., American Water Works Association Membrane Technology Conference, "Procurement of Membrane Equipment: Differences Between Water Treatment and Membrane Bioreactor (MBR) Applications," (2003).

Cui et al., "Airlift crossflow membrane filtration—a feasibility study with dextran ultrafiltration," J. Membrane Sci. (1997) vol. 128, pp. 83-91.

Davis et al., Membrane Technology Conference, "Membrane Bioreactor Evaluation for Water Reuse in Seattle, Washington" (2003).

DeCarolis et al., Membrane Technology Conference, "Optimization of Various MBR Systems for Water Reclamation" (2003).

Delgrange-Vincent et al., "Neural networks for long term prediction of fouling and backwash efficiency in ultrafiltration for drinking water production," Desalination 131 (2000) pp. 353-362.

Dow Chemical Company, "Filmtec Membranes—Cleaning Procedures for Filmtec FT30 Elements," Tech Facts, Online, Jun. 30, 2000, XP002237568.

Husain, H. et al., "The ZENON experience with membrane bioreactors for municipal wastewater treatment," MBR2: Membr. Bioreact.

(56) References Cited

OTHER PUBLICATIONS

Wastewater Treat., 2nd Intl. Meeting; School of Water Sciences, Cranfield University, Cranfield, UK, Jun. 1999.
Johnson, "Recent Advances in Microfiltration for Drinking Water Treatment," AWWA Annual Conference, Jun. 20-24, 1999, Chicago, Illinois, entire publication.
Jones, Craig, "Applications of Hydrogen Peroxide and Derivatives," The Royal Society of Chemistry, Cambridge, UK 1999, Chapters 2 and 5.
Kaiya et al., "Water Purification Using Hollow Fiber Microfiltration Membranes," 6th World Filtration Congress, Nagoya, 1993, pp. 813-816.
Kang et al. "Characteristics of microfiltration membranes in a membrane coupled sequencing batch reactor system," Water Research, 37(5) Mar. 2003, pp. 1192-1197, Elsevier, Amsterdam, NL.
Lloyd, D.R. et al. "Microporous Membrane Formation Via Thermally Induced Phase Separation/Solid-Liquid Phase Separation," Journal of Membrane Science, 52(3) (1990), pp. 239-261, Elsevier Scientific Publishing Company, Amsterdam, NL.
Lozier et al., "Demonstration Testing of ZenoGem and Reverse Osmosis for Indirect Potable Reuse Final Technical Report," published by CH2M Hill, available from the National Technical Information Service, Operations Division, Jan. 2000, entire publication.
Mark et al., "Peroxides and Peroxy Compounds, Inorganic," Kirk—Othmer Encyclopedia of Chemical Technology, Peroxides and Peroxy Compounds, Inorganic, to Piping Systems, New York, Wiley & Sons, Ed., Jan. 1, 1978, pp. 14-18.
MicroCTM—Carbon Source for Wastewater Denitrification. Information from Environmental Operating Solutions website including MSDS.
Nakayama, "Introduction to Fluid Mechanics," Butterworth-Heinemann, Oxford, UK, 2000.
Ramaswammy S. et al. "Fabrication of Ply (ECTFE) Membranes via Thermally Induced Phase Separation", Journal of Membrane Science, (Dec. 1, 2002), pp. 175-180, vol. 210 No. 1, Scientific Publishing Company, Amsterdam, NL.
Rosenberger et al., "Filterability of activated sludge in membrane bioreactors," Desalination, 151 (2002), pp. 195-200.
U.S. Appl. No. 60/278,007, filed Mar. 23, 2001.
Ueda et al., "Effects of Aeration on Suction Pressure in a Submerged Membrane Bioreactor," Wat. Res. vol. 31, No. 3, 1997, pp. 489-494.
Water Encyclopedia, edited by Jay Lehr, published by John Wiley & Sons, Inc., Hoboken, New Jersey, 2005. Available at http://wwwmmrw.interscience.wiley.com/eow/.
Webster's Ninth New Collegiate Dictionary, Merriam-Webster Inc., Publishers, Springfield, Massachusetts, USA, Copyright 1986, p. 1298.
White et al., "Optimisation of intermittently operated microfiltration processes," The Chemical Engineering Journal, 52 (1993), pp. 73-77.
Wikipedia, "Seawater," available at http://en.wikipedia.org/wiki/Seawater, Jul. 15, 2007.
Yamamoto et al., "Direct Solid-Liquid Separation Using Hollow Fiber Membrane in an Activated Sludge Aeration Tank," Water Science Technology, 21 (1989), pp. 43-54.
Yoon: "Important operational parameters of membrane bioreactor-sludge disintegration (MBR-SD) system for zero excess sludge production" Water Research, 37 (2003), pp. 1921-1931, Elsevier, Amsterdam, NL.
Zenon, "Proposal for ZeeWeed® Membrane Filtration Equipment System for the City of Westminster, Colorado, Proposal No. 479-99," Mar. 2000, entire publication.
International Search Report and Written Opinion of the International Searching Authority dated May 31, 2011 for Application No. PCT/US11/30168.
European Search Report dated Jun. 27, 2014 for Application No. EP 11775415.0.
Schematic of 4" Geyser Pump, Geyser Pump Tech. Co., Nov. 13, 2005.
Miller et al., "Side Stream Air Lift MBR Development and Successful Application of a New Generation of MBR," Pollution Solutions Brochure, NORIT, The Netherlands, Apr. 2008.
Judd, "The MBR Book: Principles and Applications of Membrane Bioreactors in Water and Wastewater Treatment," (2006), pp. 174-178.
EPA, Membrane Filtration Guidance Manual, Nov. 2005.
Australian Patent Examination Report No. 1 dated Sep. 25, 2014 for Application No. 2011245709.
Berg et al., "Flux Decline in Ultrafiltration Processes," Desalination, 77 (1990) pp. 101-133.
Lu, et al., "The Influence of Bubble Characteristic on the Performance of Submerged Hollow Fiber Membrane Module Used in Microfiltration," Separation and Technology, 61 (2008), pp. 89-95.
U.S. Appl. No. 12/064,409, filed Aug. 22, 2006.
U.S. Appl. No. 13/240,190, filed Sep. 22, 2011.

* cited by examiner

FLUID FLOW DISTRIBUTION DEVICE

CROSS-REFERENCE TO RELATED APPLICATIONS

This application claims benefit, under 35 U.S.C. § 120(a), of Australian Provisional Application Serial No. 2010901864, filed 30 Apr. 2010, the entire contents and substance of which are hereby incorporated by reference as if fully set forth below.

BACKGROUND

1. Field

Embodiments of the present invention relate to membrane filtration systems and, more particularly, to an improved cleaning method and apparatus for such systems.

2. Description of Related Art

The use of membrane filtration systems is rapidly growing. The success of such systems largely depends on employing effective and efficient membrane cleaning methods. Commonly used physical cleaning methods include backwash (e.g., back pulse, back flush) using liquid permeate or a gas, and membrane scrubbing or scouring using a gas in the form of bubbles in a liquid. Examples of this second type of method are generally described in U.S. Pat. No. 5,192,456 to Ishida et al.; U.S. Pat. No. 5,248,424 to Cote et al.; U.S. Pat. No. 5,639,373 to Henshaw et al.; U.S. Pat. No. 5,783,083 to Henshaw et al.; and International Patent Application Publication Nos. WO98/28066 and WO00/18498 (assigned to the Applicant).

These conventional methods use a variety of techniques to introduce gas bubbles into the membrane arrays to produce effective and efficient surface cleaning Effective cleaning can be achieved by introducing bubbles into the array in a uniform manner—as much as possible to produce efficient cleaning of the membrane surfaces.

Some filtration systems include a bundle of fibre membranes mounted in a generally vertical orientation between spaced upper and lower headers with bubbles flowing from below the lower header or formed by flowing gas or a gas/liquid mixture through openings in the lower header. A filtration system of this variety is illustrated in FIG. 1.

The use of openings in the lower header complicates the potting process of fibres in the lower header and can lead to breakage of the fibres in the region of the openings, as well as limitations on the packing density of the fibres within the header.

SUMMARY

Briefly described, embodiments of the present invention relate to an improved method and apparatus for flowing fluid to or from a membrane module that overcomes, or at least ameliorates, one or more of the disadvantages of the prior art or at least provides a useful alternative.

According to a first aspect, embodiments of the present invention provide a membrane filtration module comprising a fluid distribution device for distributing a flow of fluid along the surfaces of permeable hollow membranes located in the membrane module. The fluid distribution device can be adapted to removably surround at least a portion of the membranes, and define a number of through openings for distributing the fluid.

According to another aspect, embodiments of the present invention provide a membrane filtration device comprising a gas distribution device for distributing gas in the form of bubbles to the surfaces of permeable hollow membranes located in the membrane module. The gas distribution device can be adapted to removably surround at least a portion of the membranes, and define a number of through openings for distributing the gas bubbles to the membranes.

According to yet another aspect, embodiments of the present invention provide a method of distributing a fluid flowing along the surfaces of permeable hollow membranes located in the membrane module. The fluid flow can be distributed by a fluid distribution device adapted to removably surround at least a portion of the membranes and define a number of through openings for distributing the fluid.

According to another aspect, embodiments of the present invention provide a filtration system for removing fine solids from a liquid suspension comprising: a vessel for containing the liquid suspension; a plurality of permeable, hollow membranes positioned within the vessel; means for providing a pressure differential across walls of the membranes, such that some of the liquid suspension can pass through the walls of the membranes to be drawn off as permeate; means for withdrawing permeate from the membranes; and a fluid distribution device for distributing a flow of fluid along the surfaces of the permeable, hollow membranes, wherein the fluid distribution device is adapted to removably surround at least a portion of the membranes and is provided with a number of through openings for distributing the fluid.

According to another aspect, embodiments of the present invention provide a filtration system for removing fine solids from a liquid suspension comprising: a vessel for containing the liquid suspension; a plurality of permeable, hollow membranes positioned within the vessel; means for providing a pressure differential across walls of the membranes, such that some of the liquid suspension can pass through the walls of the membranes to be drawn off as permeate; means for withdrawing permeate from the membranes; and a gas distribution device for distributing gas in the form of bubbles to the surfaces of the permeable hollow membranes, wherein the gas distribution device is adapted to removably surround at least a portion of the membranes, the device being provided with a number of through openings for distributing the gas bubbles to the membranes.

In some embodiments, the permeable hollow membranes can be arranged in an elongate bundle and the fluid distribution device extends circumferentially around a portion of the bundle. For example and not limitation, the bundle of membranes extends between approximately vertical spaced upper and lower headers and the fluid distribution device extends around a portion of the bundle at or adjacent the lower header. In some embodiments, the membranes are hollow fibre membranes.

The fluid distribution device can have a ring-like configuration and the defined through openings can be evenly spaced along the circumference of the ring. In some embodiments, the fluid distribution device can be formed from two or more detachable interengaging components. For example, the fluid distribution device is formed of a pair of semicircular components. The fluid distribution device can be a clip.

According to another aspect, embodiments of the present invention provide a membrane filtration module including a number of membranes extending between spaced headers. The headers can be retained in respective first and second end housings. The end housings can incorporate means that are adapted to allow anchoring of the first and second end housings against longitudinal movement along the longitudinal axis of the module. The means can be adapted to allow anchoring comprising first and second spaced apart ridges encircling the periphery of the end housings engageable against respective opposed shoulders of an encircling clip. In addition, a first of the opposed shoulders can be mechanically supported against a sleeve member, which is mechanically supported on a header member. Also, a second of the opposed shoulders can be mechanically urged against a first end of a slidable cup member, which is sealingly slidable over the end housings and is urged into sealing engagement with the header member, wherein the clip forms a fluid distribution device with a number of through openings arranged to provide an uniform distribution of fluid flow through the device.

Further features of embodiments of the present invention, and the advantages offered thereby, are explained in greater detail hereinafter with reference to specific embodiments illustrated in the accompanying drawings, wherein like elements are indicated by like reference designators.

BRIEF DESCRIPTION OF THE DRAWINGS

FIG. 5A illustrates an isometric view of a portion of the clip, in accordance with an exemplary embodiment of the present invention.

FIG. 5B illustrates a plan view of the clip of FIG. 5A, in accordance with an exemplary embodiment of the present invention.

DETAILED DESCRIPTION

To facilitate an understanding of the principles and features of embodiments of the invention, they are explained hereinafter with reference to their implementation in an illustrative embodiment. In particular, embodiments of the present invention are described in the context of being membrane filtration systems. More particularly, embodiments of the present invention are described in the context of an improved cleaning method and apparatus for such systems.

Embodiments of the present invention, however, are not limited to its use as a membrane filtration system. Rather, embodiments of the invention can be used wherever a filtration system is needed or desired. Thus, the membrane filtration system described hereinafter for use to filter media in a fluid, such as water, can also find utility for filtering other items.

Additionally, the materials and components described hereinafter as making up the various elements of the protection system are intended to be illustrative and not restrictive. Many suitable materials and components that would perform the same or a similar function as the materials and components described herein are intended to be embraced within the scope of the invention. Such other materials and components not described herein can include, but are not limited to, materials and/or components that are developed after the time of the development of embodiments of the present invention, for example.

Figure 1:
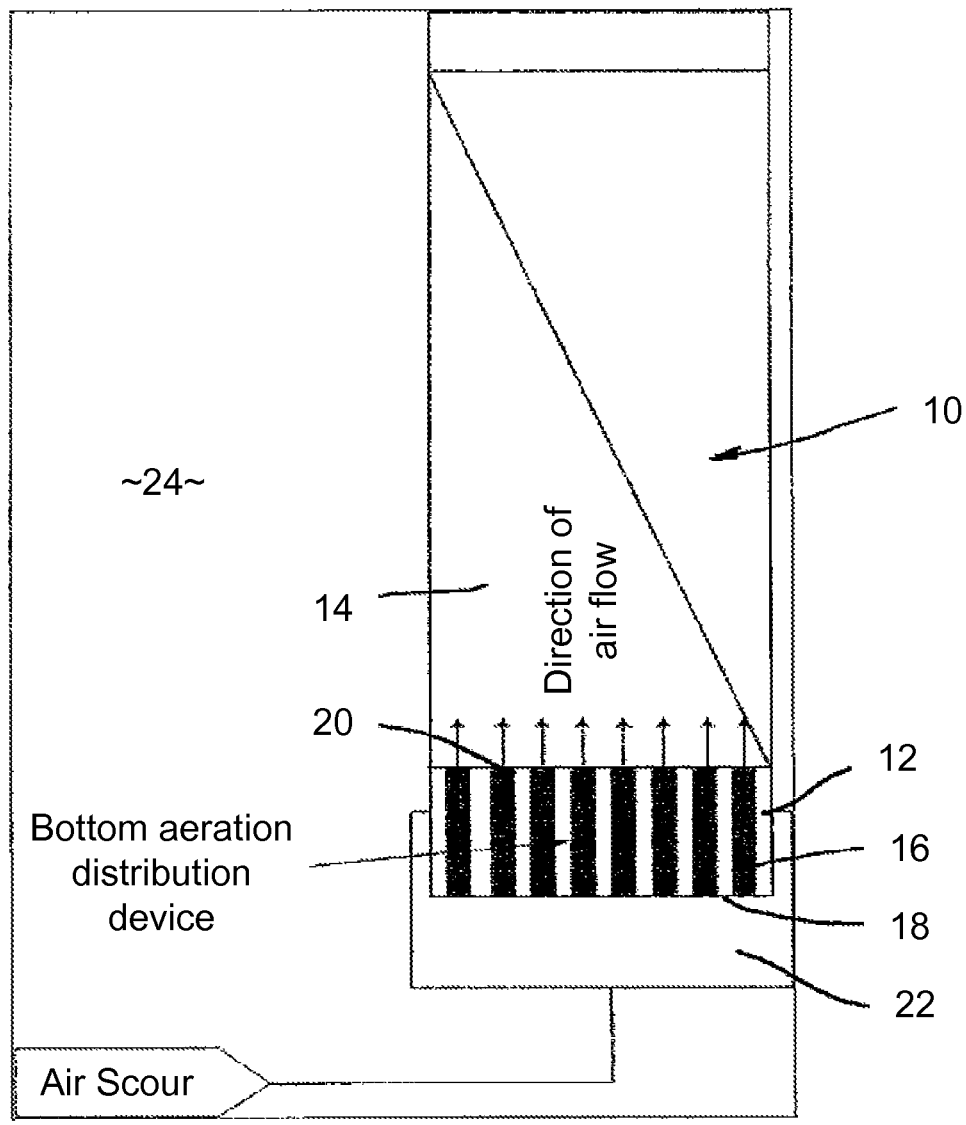
FIG. 1 illustrates a simplified schematic side elevation view of a prior art module using aeration through the lower header.

Referring now in detail to the figures, wherein like reference numerals represent like parts throughout the several views, FIG. 1 illustrates a conventional aeration method.

As shown in FIG. 1, a module 10 comprises a lower header 12, where one end of the membrane fibres forming the module 10 is potted. The fibres are typically arranged in a bundle 14 when potted. The lower header 12 can have a number of evenly distributed through-holes 16 extending therethrough from its base 18 to its upper surface 20 for provision of gas, for example air, into the base of the fibre bundle 14. The lower header 12 is in fluid communication and connected to a manifold 22, which supplies the gas to the lower openings of through-holes 16. In use, the module 10 can be immersed in feed liquid contained in a feed vessel 24 and the gas flows into the manifold 22 and upwardly through the holes 16 to form gas bubbles within the fibre bundle 14 to scour and clean the surfaces of the membranes.

This conventional aeration method—while efficient in providing a desired flow of bubbles within the fibre bundle—has a number of disadvantages. The need to define holes in the lower header complicates the potting process by requiring the formation of the holes and distribution of the fibres between the holes. Further, the holes make the use of double ended withdrawal of permeate from the membranes difficult. Also, once formed, the size and configuration of the holes cannot be easily changed without replacing the entire module. The holes also occupy space within the lower header leading to a reduction in the available possible packing density of fibres.

Figure 2:
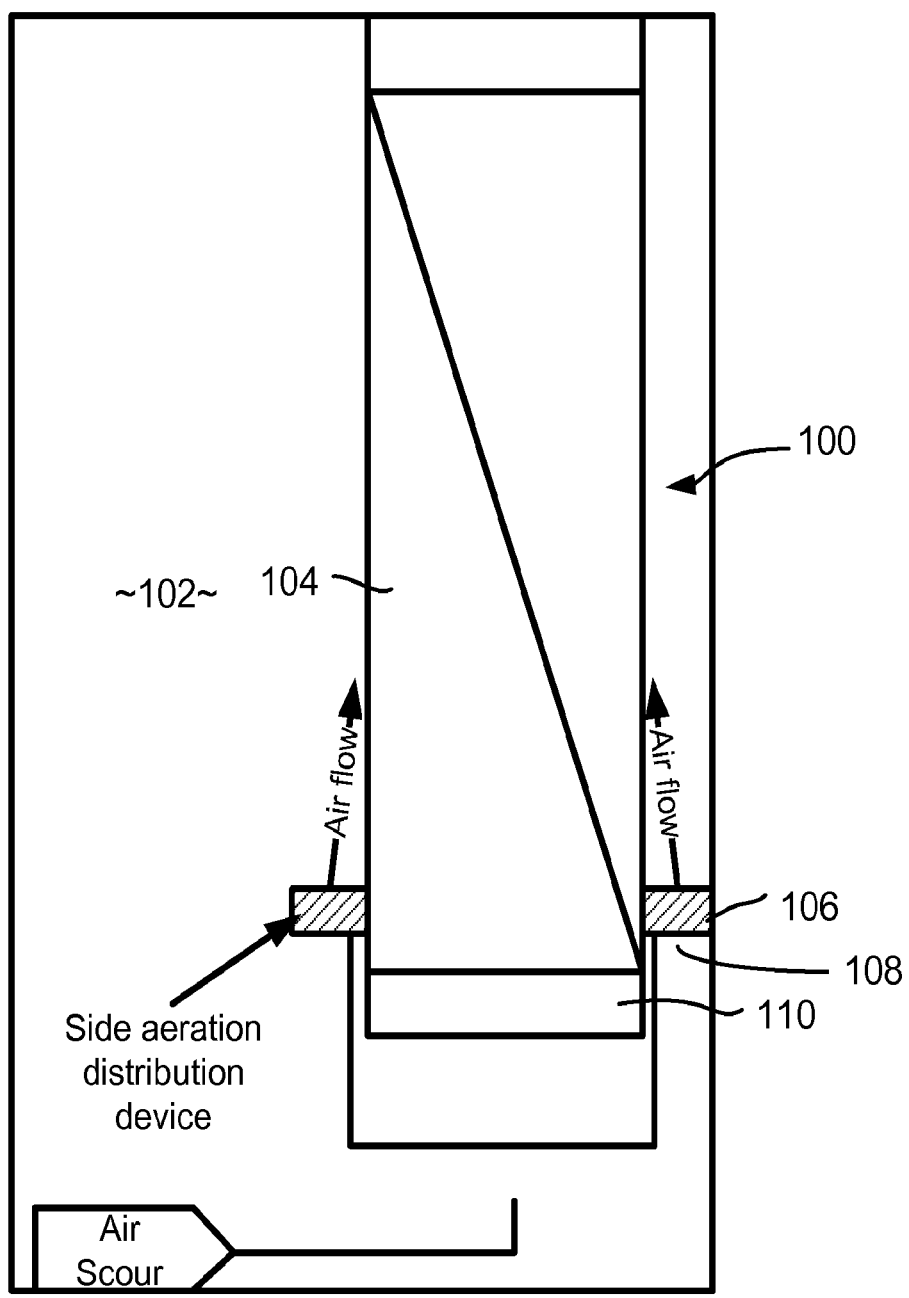
FIG. 2 illustrates a simplified schematic side elevation view similar to that of FIG. 1 illustrating a side aeration method, in accordance with an exemplary embodiment of the present invention.

FIG. 2 shows a simplified diagram of an exemplary embodiment of the present invention. A module 100 is similar in design to that shown FIG. 1, but, in this case, the scouring gas is distributed along the sides of the fibre bundle 104 by an externally mounted aeration distribution device 106 that can be positioned near or at the base of the module 100. In an exemplary embodiment, this distribution device 106 comprises a clip 108, which may be formed in two parts to fit around the fibre bundle 104, although other configurations of the aeration distribution device 106 may be used, including those having a single part or number of parts. In this embodiment, a gas or a gas bubble liquid mixture can be provided below the distribution device 106 and the distribution device 106 can direct the gas or mixture of gas bubbles and liquid evenly around or about the sides of the membrane bundle 104 to provide cleaning of the membrane surfaces.

The gas distribution method and device of embodiments of the present invention may be employed in both pressurized and submerged (non-pressurized) membrane filtration systems.

Figure 3:
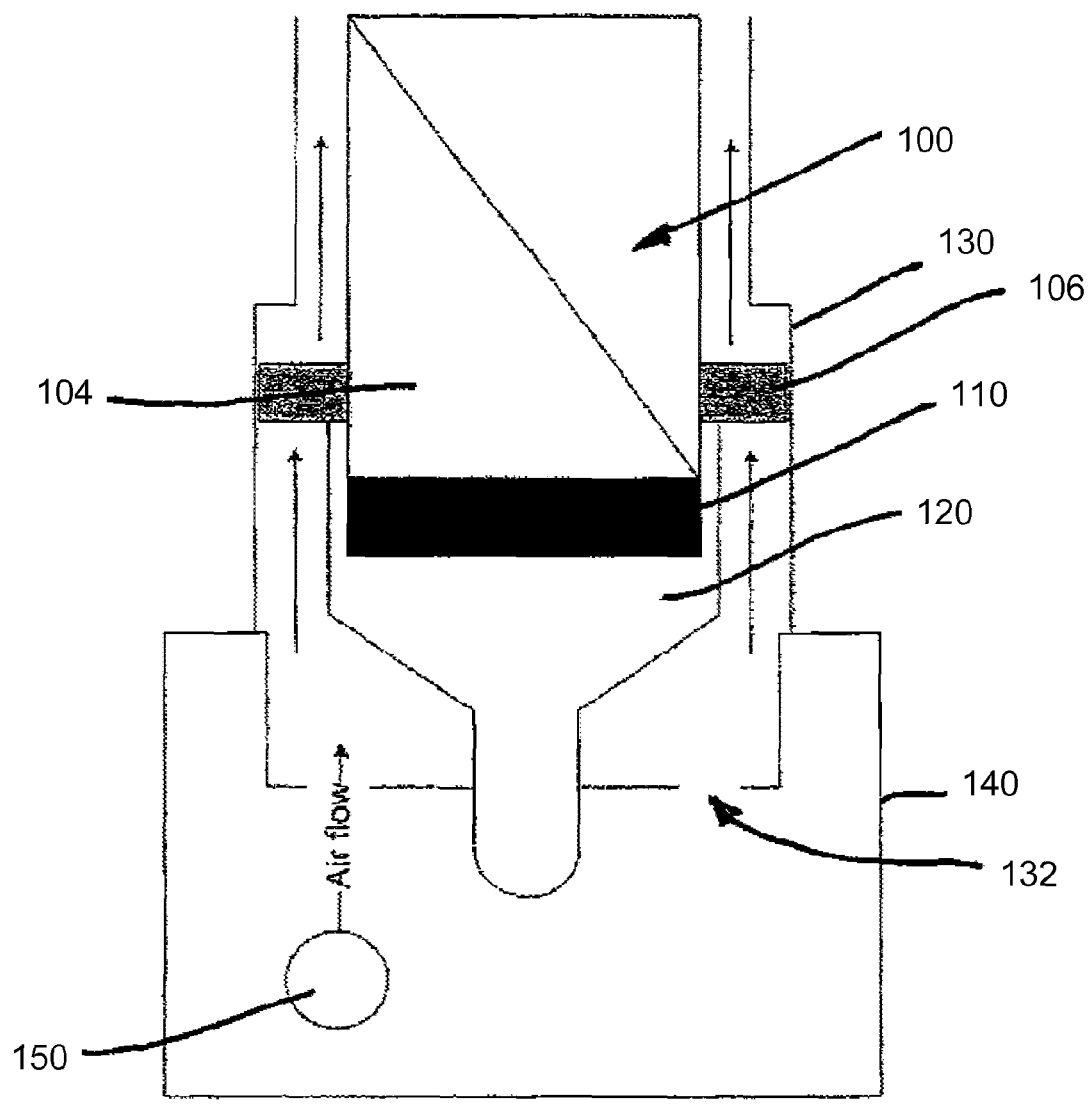
FIG. 3 illustrates a simplified schematic side elevation view of a feed manifold arrangement, in accordance with an exemplary embodiment of the present invention.
Figure 4:
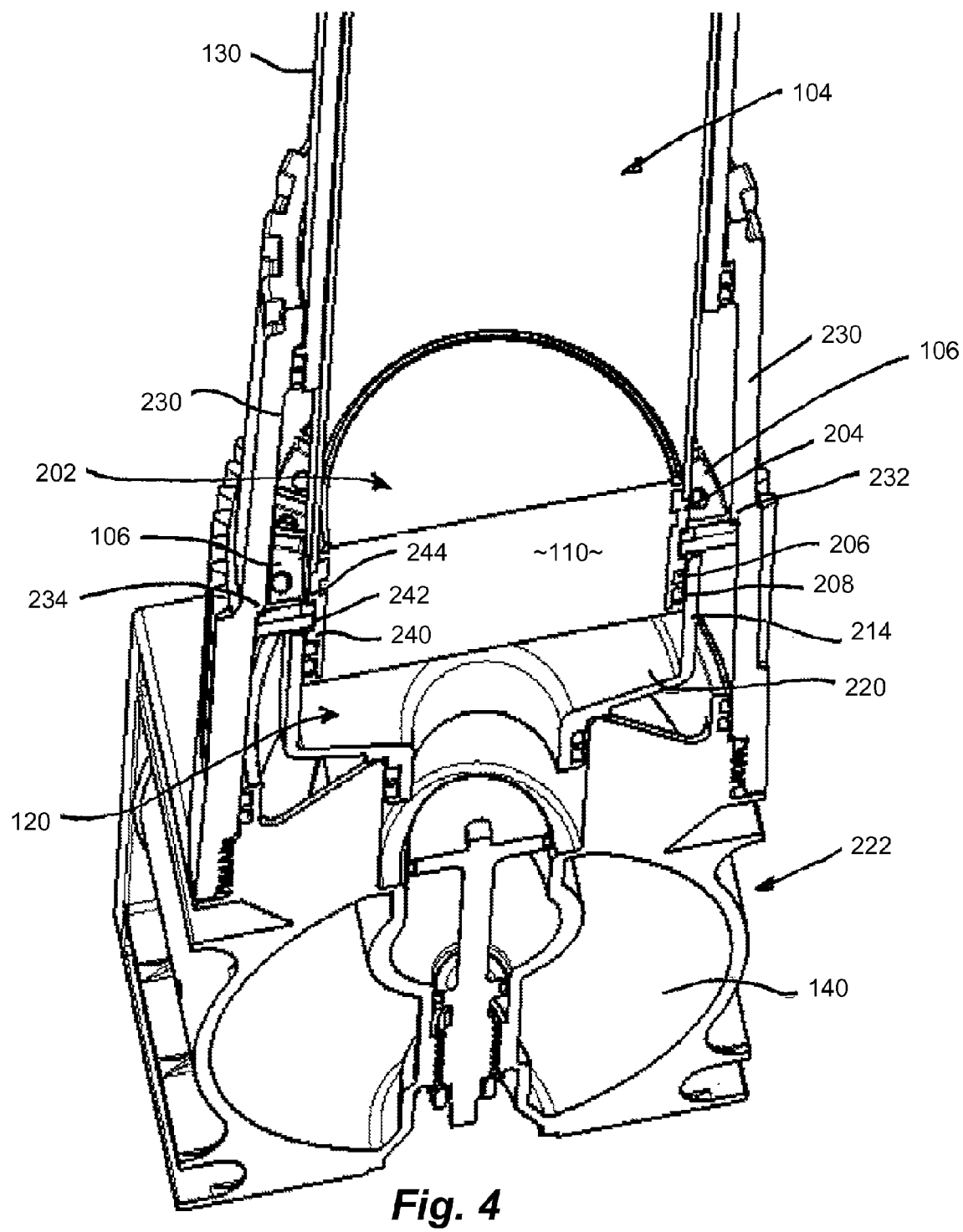
FIG. 4 illustrates an perspective view of a base portion of a pressurized module and a clip arrangement used therein to support the module, in accordance with an exemplary embodiment of the present invention.

An exemplary embodiment of the present invention employed in a pressurized filtration system will now be described. FIGS. 3-4 illustrate an exemplary arrangement of the distribution device. In this exemplary embodiment, the device used for gas distribution may also be used to support the module 100 within the pressurised vessel casing.

As shown in FIG. 3, the module 100 can include a lower permeate collection chamber 120 that is in fluid communication with the membrane ends potted in the lower header 110. The module 100 is located within a pressure housing 130 that can be fluidly connected to a feed supply manifold 140. The base of the housing 130 defines openings 132 to allow flow of feed liquid into the housing 130 and around the membranes in the bundle 104. The aeration distribution device 106 is located near the base 131 of the membrane bundle 104 and fits between the bundle 104 and the inner wall of the housing 130. Scouring or cleaning gas can be supplied into the feed supply manifold through a gas supply tube 150. The gas is supplied through openings in the tube 150 into the feed liquid to form bubbles that flow upwardly through the supply manifold 140 and through openings 132 into the housing 130. The bubbles can then continue upwardly through the distribution device 106 and along the outer surface of the membrane bundle 104, so as to remove accumulated solids from the surface of the membranes by scouring and agitating the membranes within the bundle 104.

Further detail of the configuration and mounting of the aeration distribution device is illustrated in the perspective view of FIG. 4. In some embodiments, the membrane bundle 104 is adapted to be replaced by a sideways movement of the filter cartridge containing the bundle 104 and its associated enclosing assembly, whereby the upper and lower header assemblies need not be disturbed or dismantled.

The components of the filtration module illustrated in the embodiment of FIG. 4 are a bundle of microporous hollow fibres 104 terminating in opposing ends 202. One end of the bundle is potted in the lower header 110. The lower header 110 can be encased in an end piece or cap 204 that serves as a former for the header during manufacturing and serves to provide external working surfaces that are used to support the fibre bundle 104 in use, so that it can resist both the extending forces encountered during normal filtration and the compressive forces encountered during backwash.

The end piece or cap 204 defines a pair of grooves 206, 208 for receiving O-rings that can form a slidable seal against an inner surface of connecting flange 214 of filtrate cup or housing 220. The structure of the connecting flange 214 can be such that the filtrate cup 220 can slide upwardly onto the end piece 204—when annular clip 106 forming the aeration distribution device is removed—to the extent that the upper end of the filtrate cup 220 clears (e.g., it entirely clears) internal skirt or flange of the manifold 222.

A connecting sleeve 230 further includes shoulder portions 232, 234 located on an inner surface. The shoulder portions 232, 234 are adapted to engage the circular clip 106 forming the aeration distribution device, whereby supporting pressure is applied by means of the clip 106 to one of an opposed shoulders 240 defining the groove 242 in the cap 204 when the connecting sleeve 230 is in sealed, mating relationship with the manifold 222. As a result, the cap 204 can be mechanically supported against motion along the longitudinal axis of the membrane bundle in a first direction, while the other of the opposed shoulders 244 defining the groove 242 in the cap 204 is mechanically supported against an opposed surface of the clip 106 that, in turn, is mechanically urged against a lower rim portion of the slideable cap 204 thereby urging the slideable cap 204 to an extended position with respect to the bundle 104.

As with the operation of the arrangement shown in FIG. 3, in use, feed liquid can flow through the feed supply manifold 140 and upwardly through the distribution device 106 and along the sides of the membrane bundle 104 contained within the pressure housing 130. Permeate can be withdrawn through the lower header 110 and collected in the filtrate cup 220. When gas scouring or cleaning is desired, gas can be fed into the feed supply manifold 140 and the gas bubbles formed flow upwardly through and are uniformly distributed around the membrane bundle 104 by the distribution device 106.

In an exemplary embodiment, a method of removing the clip 106 includes disengaging and sliding downwardly the outer sleeve 230 to the extent that the sleeve 230 is drawn below the level of the clip 106. The clip 106 can comprise two halves permitting the clip 106 to be disengaged from the groove 242 in the end piece 204 in which it normally resides, thereby allowing the filtrate cup 220 to be drawn downwardly, as described above.

When these clearing actions are performed on the filtrate cup 220, the clip 106 and the outer sleeve 230 located at both ends of the module 100, then the entire module 100 complete with casing and sleeves can slide sideways with respect to its longitudinal axis, so as to be lifted clear of the header assemblies without disturbing the header assemblies. A reverse process can be followed to replace the filter module and filter module assembly.

While this arrangement can be used with single ended filter cartridges it may be more useful with the double ended opposed header arrangements shown, where it is commonly more difficult, or in some cases not possible, to remove the filter cartridge without disturbing the header assemblies without compacting the filter cartridge and filter cartridge assembly in some manner along their longitudinal axes.

Figure 5C:
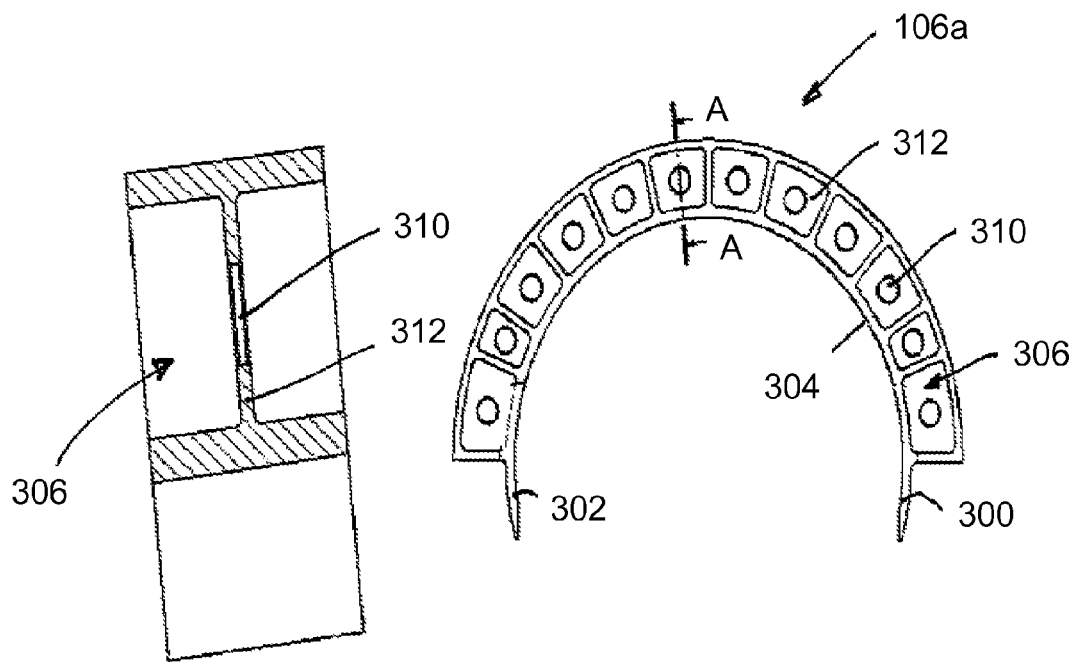
FIG. 5C illustrates a cross-sectional view taken along lines A-A of FIG. 5B, in accordance with an exemplary embodiment of the present invention.
Figure 5C:
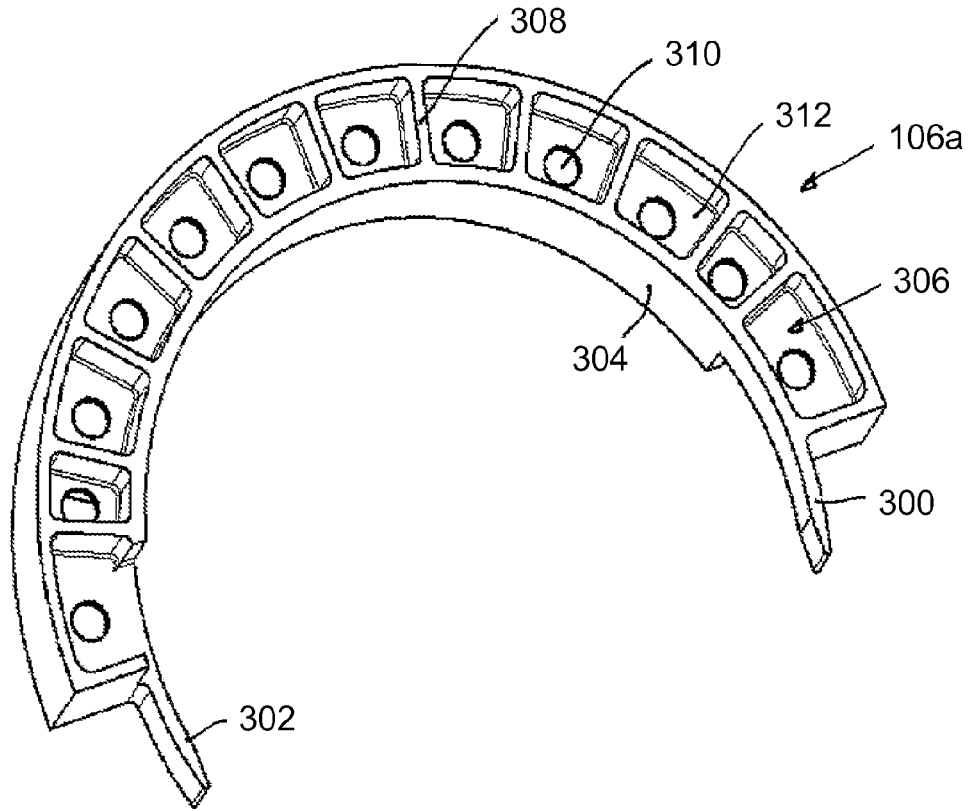

As best shown in FIG. 5A-5C, the aeration distribution device can comprise a pair of semi-circular clip portions 106a. Each free end of the clip portion 106a is provided with a respective locking protrusion 300 and 302 extending in the plane of the inner circumferential surface 304 of the clip portion 106a. One locking protrusion 300 extends in the plane of the upper surface of the clip portion 106a, while other protrusion 302 extends in the plane of the lower surface of the clip portion 106a with each protrusion having a width approximately half the width of the clip portion 106a. In use, a pair of the clip portions 106a can be fitted together with overlapping engagement of the associated locking portions 300 and 302 to form a circular clip 106 when located with the groove 242 of the end cap 204.

Each clip portion 106a, as probably best shown in FIG. 5C, can include a series of circumferentially spaced reduced width regions 306 provided generally equidistant along the length of the clip portion 106a. In some embodiments, the reduced width regions can be generally rectangular in shape, when viewed in plan, and separated from each other by a radially extending ridge 308. Each of these reduced width portions 306 defines a through opening or hole 310 formed in its base portion 312. Still referring to FIG. 5C, the base portion 312 can be centrally located between the upper and lower edges of the clip portion 106a. The number and size of the holes 310 can vary, as it may be determined by the required gas distribution and flow needed to provide efficient and uniform cleaning of the membranes in the module.

Conventional systems without an aeration distribution device where gas is provided below the module tend to produce a flow of bubbles that have a distribution favoring the path of least resistance. In other words, the bubbles tend to flow directly upward from the source of gas, unless some form of distribution device is provided to distribute and equalize the flow around the periphery of the membrane bundle to provide a uniform flow of bubbles to the whole surface of the membrane bundle.

This problem with conventional systems is further exacerbated in arrangements where a number of membrane modules are aerated from a common source of gas. In such cases, when one module becomes fouled before another, the gas flow can favor the less fouled module leading to reduced bubble flow in the fouled module and thus further increased fouling.

Embodiments of the present invention overcome this problem of conventional systems, and others, by equalizing the flow of gas between and around the modules.

The use of a removable aeration distribution device enables older style systems, where appropriate, to be retrofitted with embodiments of the present invention, while also allowing easy adjustment and optimization of the gas distribution profile of any particular module installation. In other words, aeration distribution devices having varying hole sizes and positions may be used to optimize the operation of the cleaning process for a particular module configuration.

The use of the distribution device with openings that restrict and distribute fluid flow therethrough has also been found to provide a further advantage when draining the module following a backwash or cleaning process. Typically, the liquid containing the solids dislodged during a backwashing and/or scouring process is periodically removed by a drain down of the feed vessel or module. As this drain down impinges on the filtration process time of the system, it is desirable to minimize the time taken for a drain down. Accordingly, the drain down usually results in a rapid flow of liquid from the module. A rapid and unevenly distributed liquid flow can result in undue stress being placed on the membrane portions located near the discharge region for the waste flow. The use of a distribution device according to embodiments of the invention ameliorates this problem by restricting and distributing the flow evenly amongst the membranes resulting in the less chance of damage to the membranes.

The use of the distribution device according to embodiments of the invention may result in a decrease in the aeration discharge backpressure. The backpressure experienced in the side aeration method described above is the static head of liquid level present during the scouring or cleaning process; with a bottom aeration configuration, however, where gas is supplied through holes in the lower header, the aeration must overcome both the static head pressure of the liquid level as well as the backpressure resulting from the fibres in the lower header hindering the gas flow from the holes.

The arrangement described also provides support for the end cap 204 in both an upward and a downward longitudinal direction whereby the end cap 204 (and hence the opposed ends 202) of the fibre bundle resist the compressive forces exerted during backwash and extensive forces exerted during normal filtration. This support is provided without the necessity of using any form of internal stiffening integral to the membrane module itself. Rather the mechanical support is provided by reliance on the module casing and associated header assemblies.

Figure 6:
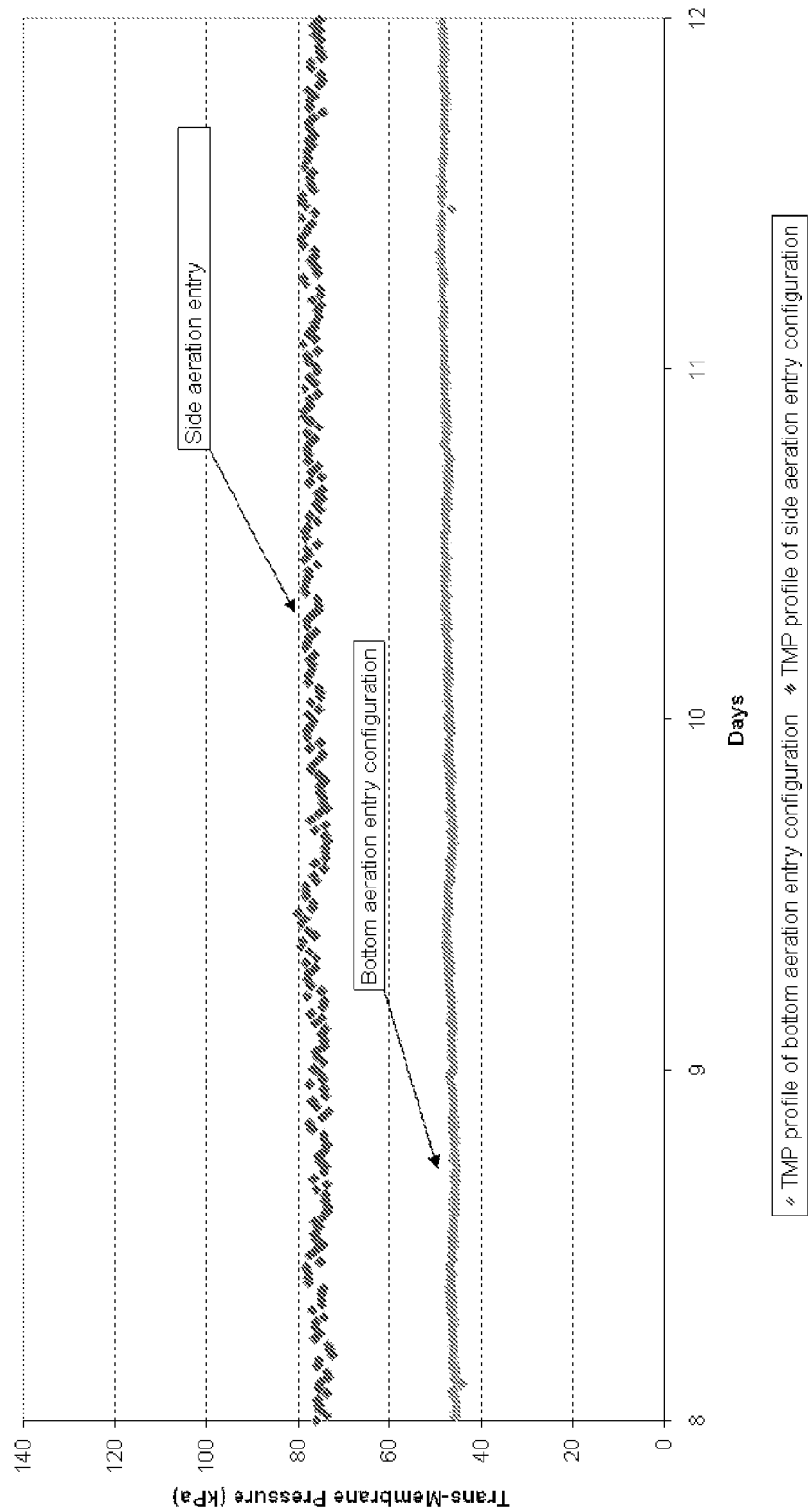
FIG. 6 illustrates a graphical representation of a transmembrane pressure profile for bottom entry aeration configuration of the module and the side aeration configuration of the module, in accordance with an exemplary embodiment of the present invention.

FIG. 6 illustrates a graphical representation comparing the performance of different aeration entry configurations by comparison of transmembrane pressure (TMP) profiles. While it is clear that the use of aeration within the fibre bundle provides a lower overall TMP profile, each profile shows a stable and comparable performance over time. Accordingly, embodiments of the present invention provide adequate performance while ameliorating a number of the disadvantages of the aeration configuration using aeration entry through the lower header.

It will be appreciated by those skilled in the art that the aeration distribution device according to the invention is not limited to the particular configurations described above and a number of variations in shape, size and construction are possible.

It will also be appreciated that further embodiments and exemplifications of the invention are possible without departing from the scope or spirit of the invention described.

What is claimed is:

1. A filtration module comprising:
    a membrane module having a plurality of permeable hollow membranes vertically extending between an upper header and a lower header;
    an end cap encasing the lower header and including a groove defined by a pair of cap shoulders;
    a feed supply manifold positioned below the lower header and configured to deliver a feed to the permeable hollow membranes;
    a gas supply device positioned below the lower header and configured to deliver a gas to the permeable hollow membranes;
    a fluid distribution device configured and positioned around the plurality of permeable hollow membranes to equalize and uniformly distribute the feed and the gas upwardly to and along surfaces of the permeable hollow membranes and restrict and distribute a waste fluid flow downwardly, the fluid distribution device including an inner surface disposed in the groove, the fluid distribution device surrounding a portion of the membranes and including a plurality of circumferentially spaced recesses separated from one another by radially extending ridges spanning an entire width of the fluid distribution device, each of the recesses defining a single through-hole opening formed in and surrounded by a reduced-width base region of each of the recesses, each of the single through-hole openings centrally located in the reduced-width base region, each of the single through-hole openings, configured to distribute a fluid along surfaces of the permeable hollow membranes; and
    a connecting sleeve including a sleeve shoulder defined on an inner surface thereof, the sleeve shoulder engaging an upper surface of the fluid distribution device, the connecting sleeve further including a bottom portion sealed with the feed supply manifold.

2. The filtration module of claim 1, wherein the fluid distribution device includes at least two detachable inter-engaging components.

3. The filtration module of claim 2, wherein the fluid distribution device includes a pair of semi-circular inter-engaging components.

4. The filtration module of claim 3, wherein the fluid distribution device supports the membrane module within a vessel casing of the filtration module.

5. A filtration module comprising:
    a membrane module having a plurality of permeable hollow membranes;
    a fluid distribution device surrounding a portion of the membrane module, the fluid distribution device including a plurality of circumferentially spaced recesses separated from one another by radially extending ridges spanning an entire width of the fluid distribution device, each of the recesses defining a single through-hole opening formed in and surrounded by a reduced-width base region of each of the recesses, each of the single through-hole openings centrally located in the reduced-width base region, each of the single through-hole openings configured to equalize and uniformly distribute a fluid along surfaces of the permeable hollow membranes and restrict and distribute a waste fluid flow downwardly.

6. The filtration module of claim 5, wherein the filtration module further includes an end cap encasing a lower header in which lower ends of the membranes are potted, and wherein the fluid distribution device includes an inner surface engaged with a groove formed in the end cap.

7. The filtration module of claim 6, wherein the filtration module further includes a connecting sleeve surrounding the end cap and extending between a feed supply manifold and a housing of the filtration module, the connecting sleeve having a shoulder defined on an inner surface, the shoulder engaged with an upper surface of the fluid distribution device.

8. The filtration module of claim 7, wherein the fluid distribution device includes a plurality of detachable inter-engaging components.

9. The filtration module of claim 7, wherein the fluid distribution device includes a pair of semi-circular inter-engaging components.

10. The filtration module of claim 9, wherein the fluid distribution device mechanically supports the end cap in the filtration module against motion along a longitudinal axis of the membrane module.

11. A filtration system comprising:
a vessel;
a membrane module including a plurality of permeable hollow membranes positioned within the vessel;
a first system configured to provide a pressure differential across walls of the membranes;
a second system configured to withdraw permeate from the membranes; and
a fluid distribution device surrounding a portion of the membrane module, the fluid distribution device including a plurality of circumferentially spaced recesses separated from one another by radially extending ridges spanning an entire width of the fluid distribution device, each of the recesses defining a single through-hole opening formed in and surrounded by a reduced-width base region of each of the recesses, each of the single through-hole openings centrally located in the reduced-width base region, each of the single through-hole openings configured to equalize and uniformly distribute a fluid along surfaces of the permeable hollow membranes and restrict and distribute a waste fluid flow downwardly.

12. The filtration system of claim 11, wherein the fluid distribution device comprises an aeration distribution system mounted externally from the plurality of permeable hollow membranes.

13. The filtration module of claim 12, wherein the filtration system further includes an end cap encasing a lower header in which lower ends of the membranes are potted, and wherein the fluid distribution device includes an inner surface engaged with a groove formed in the end cap.

14. The filtration module of claim 13, wherein filtration system further includes a connecting sleeve surrounding the end cap and extending between a feed supply manifold and a housing of the filtration system, the connecting sleeve having a shoulder defined on an inner surface thereof, the shoulder engaged with an upper surface of the fluid distribution device.

15. A filtration system comprising:
at least one filtration module having a plurality of permeable hollow membranes vertically extending between an upper header a lower header and disposed in a vessel, the module having:
an end cap encasing the lower header;
a fluid distribution device engaged with the end cap, the fluid distribution device surrounding a portion of the membranes and positioned and configured to uniformly direct liquid feed from a liquid feed supply manifold and gas from a gas supply device upwardly to contact surfaces of the plurality of permeable hollow membranes, and restrict and distribute a waste fluid flow downwardly, and including a plurality of circumferentially spaced recesses separated from one another by radially extending ridges spanning an entire width of the fluid distribution device, each recess defining a single through-hole opening formed in and surrounded by a reduced-width base region of each of the recesses, each of the single through-hole openings centrally located in the reduced-width base region, each of the single through-hole openings configured to distribute a fluid along surfaces of the permeable hollow membranes; and
a connecting sleeve engaged with the fluid distribution device, the connecting sleeve surrounding the end cap and coupling a lower manifold of the filtration system to a housing surrounding the at least one filtration module.

16. The filtration system of claim 15, wherein the fluid distribution device includes at least two detachable inter-engaging components.

17. The filtration module of claim 15, wherein the fluid distribution device mechanically supports the end cap against motion along a longitudinal axis of the filtration module.

18. The filtration module of claim 15, wherein the fluid distribution device urges the end cap to an extended position with respect to the at least one filtration module.

19. The filtration module of claim 1, wherein the fluid distribution device is positioned above the lower header.

20. The filtration module of claim 5, wherein each reduced-width base region is generally rectangular in shape.

* * * * *